(12) United States Patent
Harms et al.

(10) Patent No.: US 12,536,802 B2
(45) Date of Patent: Jan. 27, 2026

(54) SURVEILLANCE SYSTEMS, METHODS, AND APPARATUSES

(71) Applicant: Trinity Innovative Solutions, LLC, Frisco, TX (US)

(72) Inventors: Dwight David Harms, The Colony, TX (US); Timothy Francis Hall, The Colony, TX (US)

( * ) Notice: Subject to any disclaimer, the term of this patent is extended or adjusted under 35 U.S.C. 154(b) by 20 days.

(21) Appl. No.: 18/224,012

(22) Filed: Jul. 19, 2023

(65) Prior Publication Data

US 2025/0148793 A1  May 8, 2025

Related U.S. Application Data

(60) Provisional application No. 63/390,534, filed on Jul. 19, 2022.

(51) Int. Cl.
| | | |
|---|---|---|
| *G06V 20/00* | (2022.01) | |
| *B60L 1/00* | (2006.01) | |
| *G06V 20/52* | (2022.01) | |
| *G06V 20/62* | (2022.01) | |

(52) U.S. Cl.
CPC ............... *G06V 20/52* (2022.01); *B60L 1/00* (2013.01); *G06V 20/625* (2022.01)

(58) Field of Classification Search
CPC .......... G06V 20/52; G06V 20/625; B60L 1/00
See application file for complete search history.

(56) References Cited

U.S. PATENT DOCUMENTS

| | | |
|---|---|---|
| 1,095,953 A | 5/1914 | Baker |
| 1,853,459 A | 4/1932 | Russell et al. |
| D148,736 S | 2/1948 | Travis |
| 3,237,545 A | 3/1966 | Gillick et al. |
| 3,274,915 A | 9/1966 | Ziegenfelder |
| 3,943,726 A | 3/1976 | Miller |
| 4,228,569 A | 10/1980 | Snyder |
| 4,558,634 A | 12/1985 | Oshiro et al. |

(Continued)

FOREIGN PATENT DOCUMENTS

| | | |
|---|---|---|
| CN | 102289135 A | 12/2011 |
| CN | 112166281 A | 1/2021 |

(Continued)

OTHER PUBLICATIONS

Merc Merc-LPR Portfolio https://web.archive.org/web/20220517080628/https://www.comprehensivecom.net/merc-lpr/.*

(Continued)

*Primary Examiner* — Frank F Huang
(74) *Attorney, Agent, or Firm* — J. Andrew Reed; Think Differently Legal, PLLC

(57) ABSTRACT

A system, method, or apparatus for surveillance. A system of surveillance devices that can be interconnected in a modular manner that allows for portability and deploy ability. The devices may include a trailer that can be secured at location by the removal of the trailer tongue, wherein the trailer includes various surveillance devices for monitoring. Similarly, the trailer may also have a toolbox (that may also be secured to a vehicle) that can be used for surveillance. The toolbox can include multiple surveillance devices, while keeping the devices secured within a housing or main body with a cooling device to allow for operability.

21 Claims, 24 Drawing Sheets

(56) References Cited

U.S. PATENT DOCUMENTS

| | | |
|---|---|---|
| 4,834,615 A | 5/1989 | Mauch |
| 4,852,988 A | 8/1989 | Velez et al. |
| D306,870 S | 3/1990 | Overstreet |
| 4,942,921 A | 7/1990 | Haessig et al. |
| D310,167 S | 8/1990 | Reber |
| 4,955,203 A | 9/1990 | Sundhar |
| 4,986,169 A | 1/1991 | Chen |
| 5,016,850 A | 5/1991 | Plahn |
| 5,124,847 A | 6/1992 | Gong |
| D331,005 S | 11/1992 | Plahn |
| 5,159,730 A | 11/1992 | Radvin |
| 5,167,573 A | 12/1992 | Kanno et al. |
| 5,205,781 A | 4/1993 | Kanno et al. |
| 5,205,782 A | 4/1993 | Ohba |
| 5,208,618 A | 5/1993 | Brunette |
| 5,246,193 A | 9/1993 | Faidley |
| 5,316,361 A | 5/1994 | Miller |
| 5,356,192 A | 10/1994 | Schierau |
| 5,413,528 A | 5/1995 | Pabst et al. |
| 5,452,500 A | 9/1995 | Revis |
| D364,269 S | 11/1995 | Sabosky |
| 5,497,214 A | 3/1996 | Labree |
| 5,667,176 A | 9/1997 | Zamarripa et al. |
| D386,215 S | 11/1997 | White et al. |
| D386,245 S | 11/1997 | White |
| 5,689,442 A | 11/1997 | Swanson |
| 5,695,164 A | 12/1997 | Hartmann et al. |
| D393,797 S | 4/1998 | Kostigian |
| 5,779,536 A | 7/1998 | McCorkel et al. |
| 5,839,293 A | 11/1998 | Teitelbaum et al. |
| 5,911,395 A | 6/1999 | Hussaini |
| 6,068,551 A | 5/2000 | Oremland |
| 6,185,303 B1 | 2/2001 | Losey |
| 6,186,886 B1 | 2/2001 | Farrington et al. |
| D438,452 S | 3/2001 | Tsai |
| 6,224,479 B1 | 5/2001 | Lino |
| 6,361,429 B1 | 3/2002 | Pawlak, III |
| 6,457,218 B1 | 10/2002 | Lawrence |
| 6,474,089 B1 | 11/2002 | Chen |
| D477,029 S | 7/2003 | Korowitz |
| D477,364 S | 7/2003 | Tsai |
| D478,628 S | 8/2003 | Sheldon et al. |
| D497,183 S | 10/2004 | Chiu |
| D523,477 S | 6/2006 | Cetera |
| D534,939 S | 1/2007 | Sheehan et al. |
| D552,978 S | 10/2007 | Liao |
| D563,452 S | 3/2008 | Tan et al. |
| D564,559 S | 3/2008 | Stephens et al. |
| D566,537 S | 4/2008 | Wen-Po |
| D571,278 S | 6/2008 | Carnevali |
| 7,396,075 B2 | 7/2008 | Ohkuma |
| D607,716 S | 1/2010 | Chiu |
| 7,699,096 B2 | 4/2010 | Naruse et al. |
| D614,945 S | 5/2010 | Chiu |
| 7,733,464 B2 * | 6/2010 | David .................. G01S 17/18 356/5.03 |
| D619,451 S | 7/2010 | Carlesso |
| 7,762,512 B2 | 7/2010 | Carnevali |
| 7,775,486 B2 | 8/2010 | Depay et al. |
| D631,509 S | 1/2011 | Liang |
| 7,881,496 B2 * | 2/2011 | Camilleri ............. G08G 1/16 348/148 |
| D637,480 S | 5/2011 | Chen et al. |
| D679,700 S | 4/2013 | Werth |
| D682,256 S | 5/2013 | Murchison et al. |
| D682,332 S | 5/2013 | Wang et al. |
| 8,564,497 B1 | 10/2013 | Dickie |
| 8,632,046 B2 | 1/2014 | Sun |
| D702,535 S | 4/2014 | Rothbaum et al. |
| 8,821,224 B2 | 9/2014 | Alexander et al. |
| D715,790 S | 10/2014 | Conomos et al. |
| 8,890,954 B2 | 11/2014 | O'Donnell |
| D723,536 S | 3/2015 | Werth |
| D730,160 S | 5/2015 | Rothbaum et al. |
| 9,367,746 B2 * | 6/2016 | Ishihara ............... G06V 40/23 |
| 9,410,717 B2 | 8/2016 | Marleau et al. |
| 9,475,531 B2 | 10/2016 | Rawlings et al. |
| D778,880 S | 2/2017 | Belitz et al. |
| D786,882 S | 5/2017 | Cho |
| D795,844 S | 8/2017 | Harper |
| 9,797,422 B2 | 10/2017 | Giannatti |
| 9,826,128 B1 | 11/2017 | Ballard |
| 9,828,073 B1 | 11/2017 | Cifers |
| D810,179 S | 2/2018 | Harms et al. |
| D820,342 S | 6/2018 | Harms et al. |
| D831,660 S | 10/2018 | Yao et al. |
| 10,288,217 B2 | 5/2019 | Griggs |
| 10,310,264 B2 | 6/2019 | Imasaka et al. |
| D856,780 S | 8/2019 | Harms et al. |
| 10,495,953 B2 | 12/2019 | Calhoun |
| D872,559 S | 1/2020 | Harms et al. |
| 10,783,559 B1 * | 9/2020 | Tran .................. H04W 4/40 |
| D897,821 S | 10/2020 | Harms et al. |
| 10,987,992 B2 | 4/2021 | Harms |
| 11,184,588 B2 | 11/2021 | Harms |
| D939,825 S | 1/2022 | Omelchenko et al. |
| 11,577,584 B2 | 2/2023 | Harms et al. |
| 11,736,664 B2 | 8/2023 | Harms |
| D997,833 S | 9/2023 | Stepanov et al. |
| 2002/0041089 A1 * | 4/2002 | Yasui ............... B60R 21/01534 280/728.2 |
| 2002/0072321 A1 | 6/2002 | Kowalski et al. |
| 2002/0173264 A1 | 11/2002 | Ottman et al. |
| 2002/0186148 A1 | 12/2002 | Trajkovic |
| 2003/0109214 A1 | 6/2003 | Yamashiro |
| 2003/0174865 A1 | 9/2003 | Vernon |
| 2004/0031248 A1 | 2/2004 | Lindsay |
| 2004/0146203 A1 * | 7/2004 | Yoshimura ............ G06T 7/254 382/218 |
| 2004/0165091 A1 * | 8/2004 | Takemura .............. H04N 23/70 348/E5.034 |
| 2004/0219874 A1 | 11/2004 | Karadia |
| 2005/0003751 A1 | 1/2005 | Thomas |
| 2005/0011692 A1 | 1/2005 | Takahashi |
| 2005/0244033 A1 | 11/2005 | Ekin |
| 2006/0080986 A1 | 4/2006 | Inoue |
| 2006/0125276 A1 | 6/2006 | Chen |
| 2006/0180670 A1 * | 8/2006 | Acosta ............... G06K 7/10732 235/462.31 |
| 2006/0270332 A1 | 11/2006 | Kober et al. |
| 2007/0063124 A1 | 3/2007 | Kouchi et al. |
| 2007/0211157 A1 * | 9/2007 | Humpoletz ............ G01J 5/22 348/333.01 |
| 2007/0296849 A1 * | 12/2007 | Sano ............... H04N 23/70 348/E5.034 |
| 2008/0085672 A1 | 4/2008 | Creed et al. |
| 2008/0231744 A1 | 9/2008 | Khanna et al. |
| 2009/0021612 A1 * | 1/2009 | Hamilton, Jr. ....... H04N 25/447 348/E9.037 |
| 2009/0088064 A1 | 4/2009 | Lin |
| 2009/0153699 A1 * | 6/2009 | Satoh .................. H04N 25/715 348/229.1 |
| 2009/0191805 A1 | 7/2009 | Cusumano et al. |
| 2009/0199572 A1 | 8/2009 | Klein et al. |
| 2009/0244288 A1 * | 10/2009 | Fujimoto ............ H04N 23/11 250/206 |
| 2009/0308994 A1 | 12/2009 | Moore |
| 2010/0149393 A1 * | 6/2010 | Zarnowski ........... H04N 25/534 348/E5.091 |
| 2010/0265316 A1 * | 10/2010 | Sali ..................... H04N 13/254 348/46 |
| 2011/0268194 A1 * | 11/2011 | Nagano ............ H04N 21/23614 375/E7.076 |
| 2011/0298241 A1 | 12/2011 | Varns |
| 2012/0160446 A1 | 6/2012 | Creed et al. |
| 2013/0045108 A1 | 2/2013 | Zhou |
| 2013/0294643 A1 | 11/2013 | Fan |
| 2013/0329006 A1 * | 12/2013 | Boles .................. H04N 1/482 348/42 |
| 2014/0112537 A1 | 4/2014 | Frank |
| 2014/0313406 A1 | 10/2014 | Becker |
| 2014/0315478 A1 | 10/2014 | Kim |
| 2015/0246592 A1 | 9/2015 | Fisher |

(56) References Cited

U.S. PATENT DOCUMENTS

| | | |
|---|---|---|
| 2016/0161052 A1 | 6/2016 | Griggs |
| 2016/0216513 A1 | 7/2016 | Uchiyama et al. |
| 2019/0306466 A1 | 10/2019 | Herrmann et al. |
| 2023/0150345 A1 | 5/2023 | Harms |
| 2023/0412773 A1 | 12/2023 | Harms |

FOREIGN PATENT DOCUMENTS

| | | |
|---|---|---|
| JP | 08268046 A | 10/1996 |
| JP | H08268046 A | 10/1996 |
| JP | H08282392 A | 10/1996 |
| JP | H08282393 | 10/1996 |
| JP | 2002254924 A | 9/2002 |
| KR | 102157509 | 9/2020 |
| KR | 102157509 B1 | 9/2020 |
| WO | 0061397 A1 | 10/2000 |
| WO | 2010146572 A1 | 12/2010 |
| WO | 2012020254 A1 | 2/2012 |

OTHER PUBLICATIONS

May 1, 2022 (Year: 2022).*

Lepelstat Crafts, "Episode 4—Building a French Cleat Camera Mount,", Youtube video URL: https://www.youtube.com/watch?v=k3s_PxHoXtw, Published Nov. 23, 2015 (Year: 2015).

U.S. Appl. No. 29/723,762, filed Feb. 10, 2020, Dwight David Harms.

U.S. Appl. No. 29/752,334, filed Sep. 26, 2020, Dwight David Harms.

Action Camera Accessories Bag Clip Backpack Mount. [online] Published Apr. 20, 2018. Retrieved Nov. 16, 2018 from URL: https://www.gearbest.com/action-cameras-sport-dv-accessories/pp_1634764.html.

Klick Fast Anti-Tilt Body Worn Camera Spring Claim. [online] Retrieved Nov. 16, 2018 from URL: https://www.rewiresecurity.co.uk/peter-jones-klick-fast-dockclamp-anti-tilt-mount.

* cited by examiner

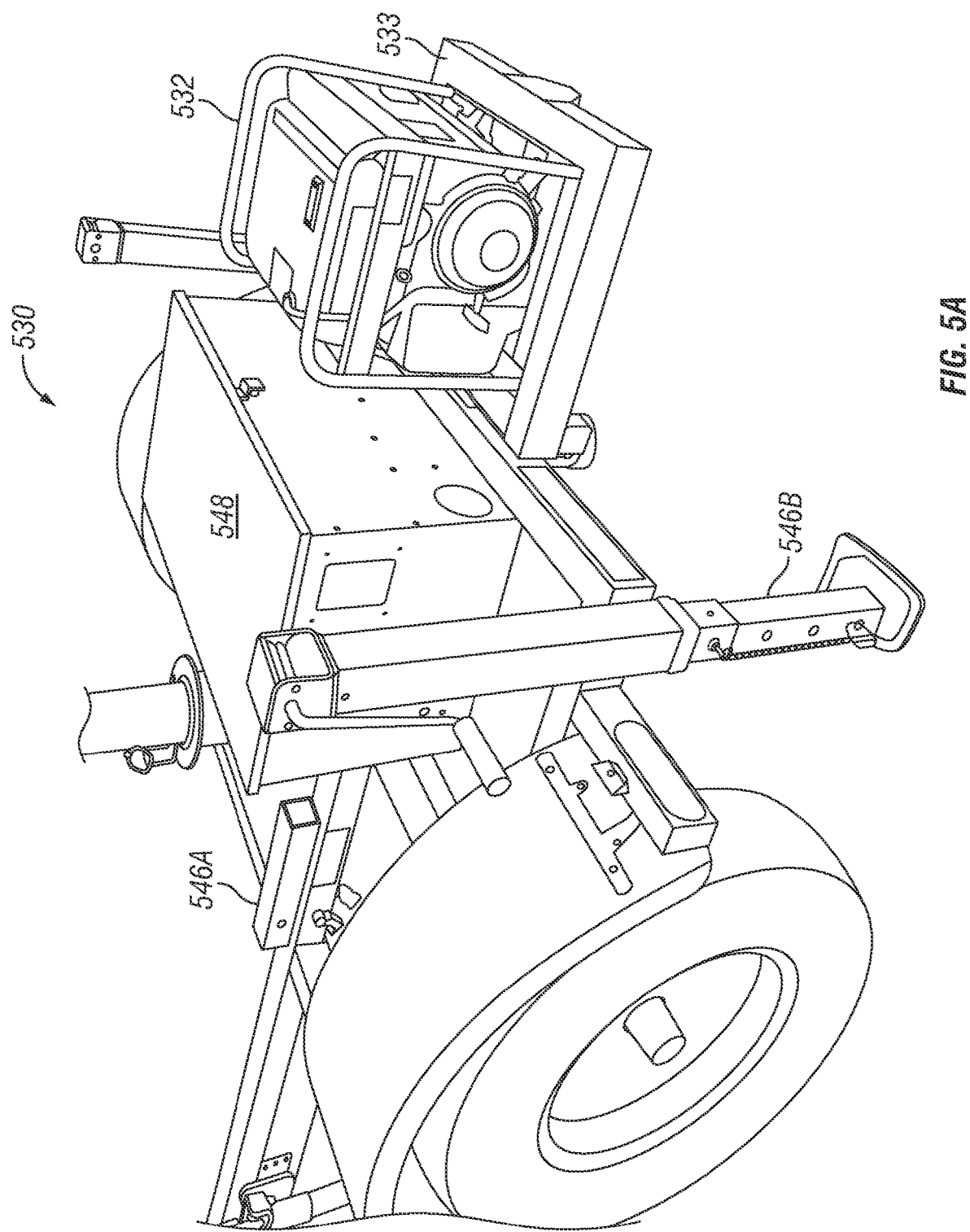

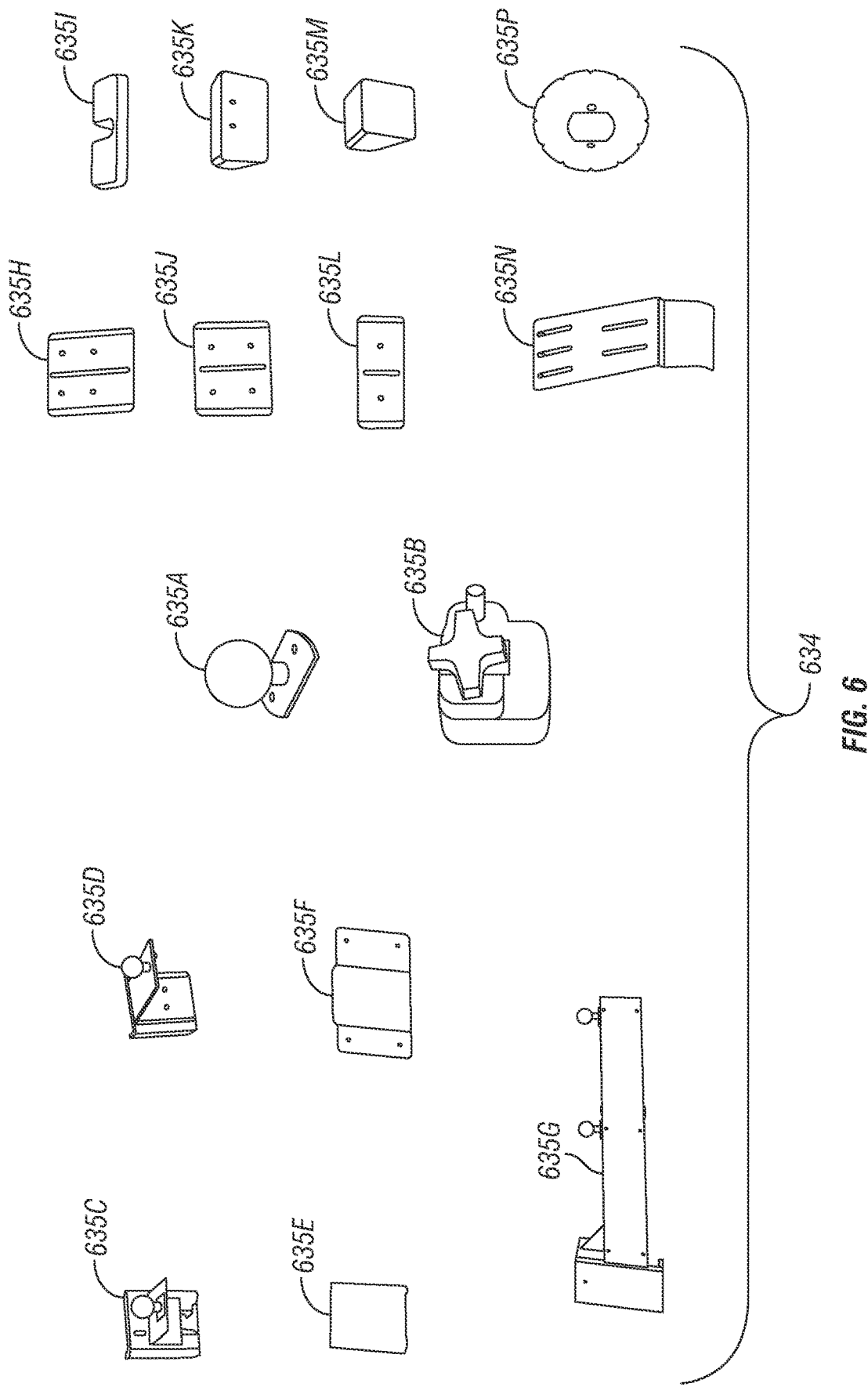

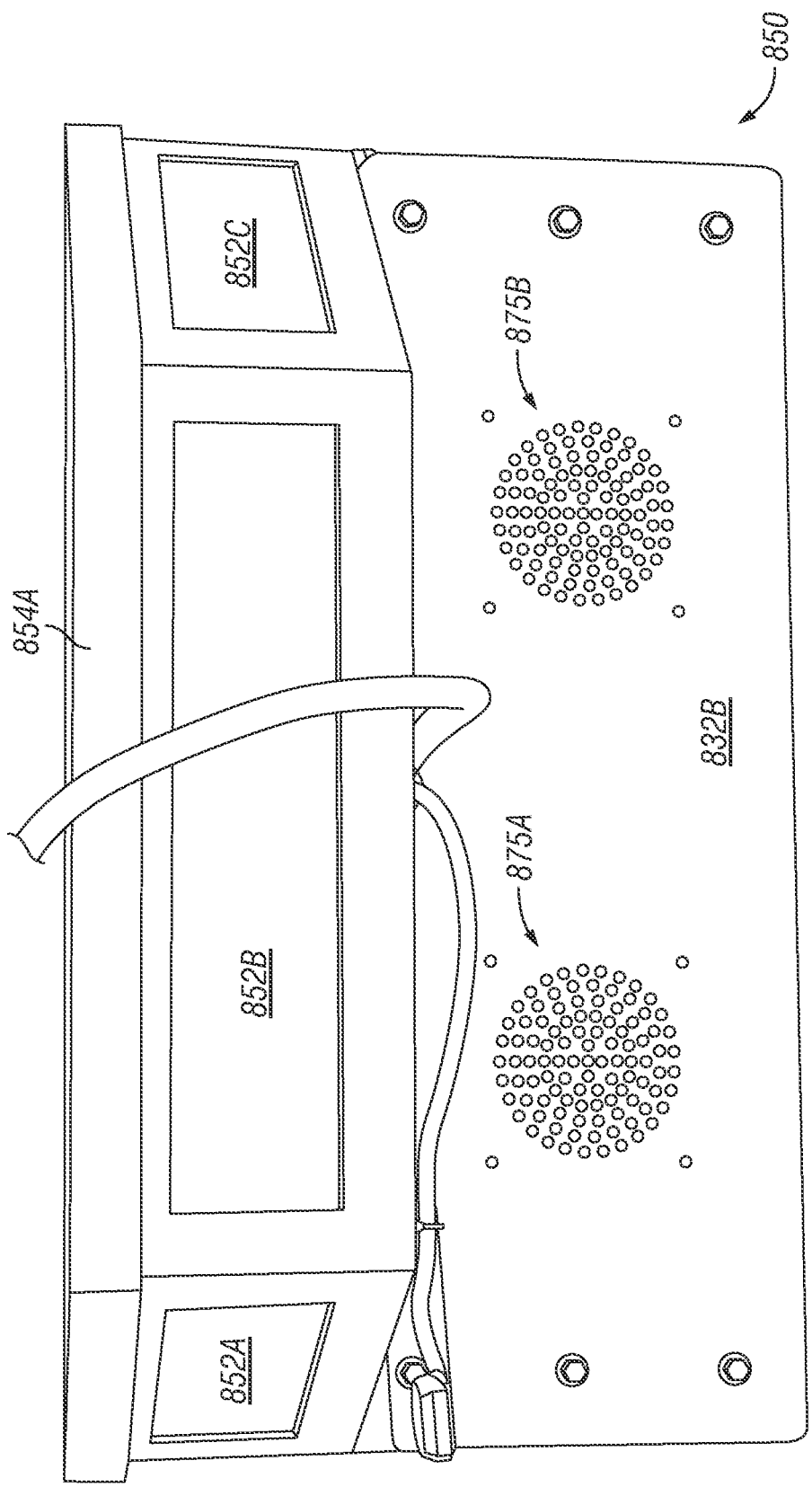

SURVEILLANCE SYSTEMS, METHODS, AND APPARATUSES

CROSS-REFERENCE TO RELATED APPLICATIONS

This application claims the benefit of U.S. Provisional Application No. 63/390,534, filed Jul. 19, 2022, the disclosure of which is incorporated herein by reference.

BACKGROUND

Technical Field

The present disclosure relates to Surveillance technology. More particularly, and not by way of limitation, the present disclosure is directed to a system, method, and apparatus for surveillance.

Description of Related Art

The need for surveillance for law enforcement, businesses, schools, municipalities, or individuals is increasing at an ever-growing rate. Accordingly, there is a need for surveillance technology that can be cross-compatible with other devices, technology, or systems in a manner that allows for increased deployment.

It would be advantageous to have a system, method, or apparatus for surveillance that overcomes the disadvantages of the prior art. The present disclosure provides such a system and method.

BRIEF SUMMARY

The present disclosure is portable surveillance system that allows for modularity in components that can be interconnected. Thus, in one aspect, the present disclosure is directed to a surveillance trailer having the ability to include multiple mounting units that allow for portable devices to be coupled to the trailer. In another aspect, the present disclosure is directed to a surveillance toolbox that incorporates a cooling unit. In yet another aspect, the present disclosure is directed to a surveillance system with an engagement unit that couples to a vehicle.

Other aspects, embodiments and features of the present disclosure will become apparent from the following detailed description when considered in conjunction with the accompanying figures. In the figures, each identical, or substantially similar component that is illustrated in various figures is represented by a single numeral or notation. For purposes of clarity, not every component is labeled in every figure. Nor is every component of the disclosure shown where illustration is not necessary to allow those of ordinary skill in the art to understand the disclosure.

BRIEF DESCRIPTION OF THE DRAWINGS

The novel features believed characteristic of the disclosure are set forth in the appended claims. The disclosure itself, however, as well as a preferred mode of use, further objectives and advantages thereof, will be best understood by reference to the following detailed description of illustrative embodiments when read in conjunction with the accompanying drawings, wherein:

FIG. 5A is an illustration of a trailer.

FIG. 6 is an illustration of multiple mounting devices.

FIG. 8D is an illustration of a closed side view of a toolbox.

DETAILED DESCRIPTION

Figure 1:
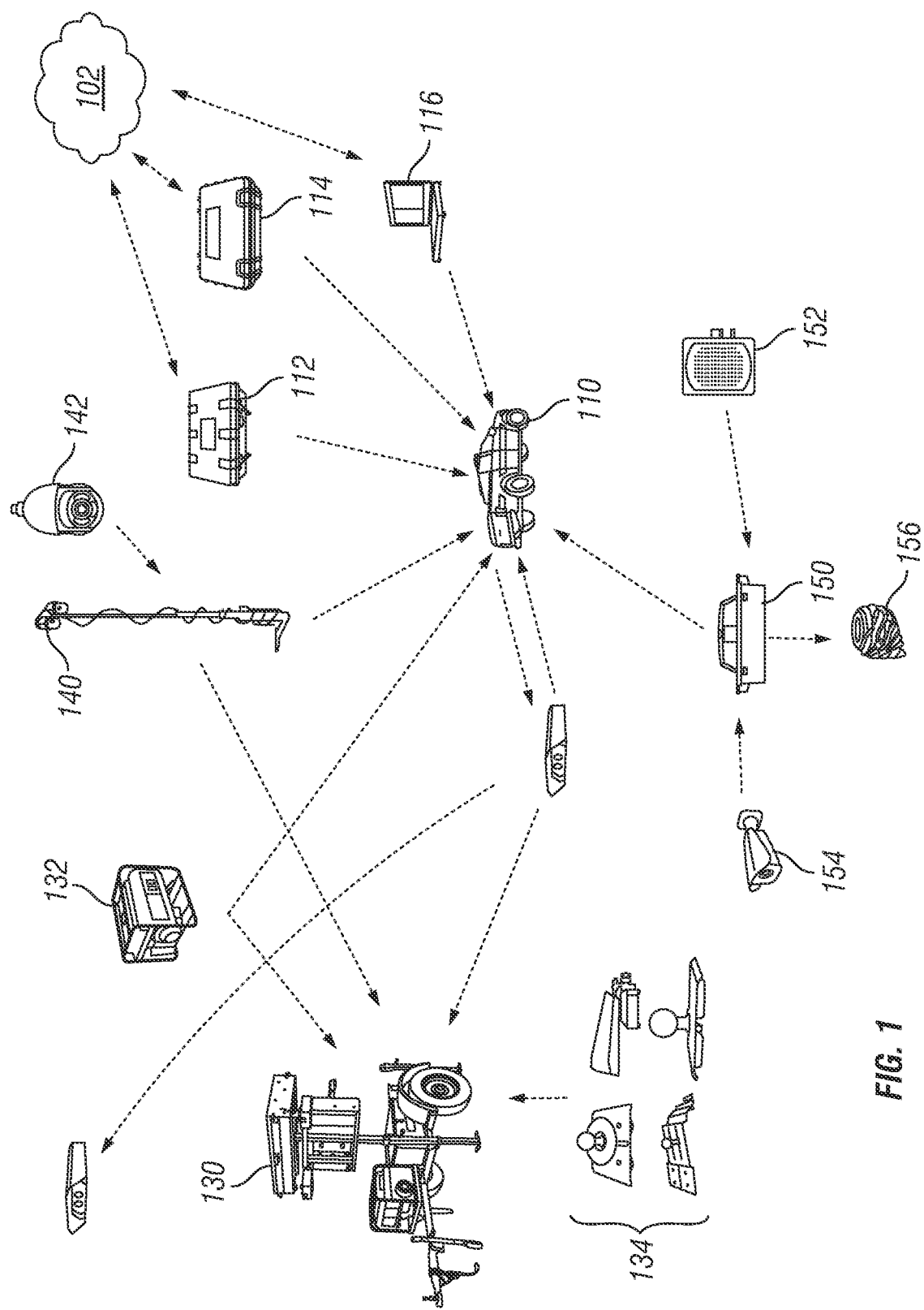
FIG. 1 is an ecosystem illustration view of a surveillance system.

Embodiments of the disclosure will now be described in the present disclosure. FIG. 1 is an ecosystem illustration view of a surveillance system 100.

The surveillance system, sometimes referenced as a surveillance ecosystem 100 can allow for multiple types of surveillance to interface with multiple different analysis programs. These analysis programs can then allow for multiple different analysis to be run at the same time. This can save time which is critical for law enforcement, as it can be the difference between catching a criminal or not catching them. For example, a criminal may be detected by one type of surveillance, and then can be detected with other types of surveillance and correlated to different incoming signals. This can allow for law enforcement to move and/or act strategically to capture suspects as information is provided and/or updated. For example, a mobile interview room may allow for a suspect or witness to be interviewed at the site of a crime while communicating information to a set of central databases and/or servers that can then transmit relevant information to each of the various analysis systems/services and/or surveillance systems/apparatuses.

A surveillance system 100 can allow for there to be multiple surveillance devices, apparatuses, and/or systems coupled together to operate as a single operations center. In some examples, the surveillance devices, apparatus, and/or systems may operate through the use of edge computing, cloud computing, and/or central computing as desired. For example, an enclosure that allows for image and/or device surveillance may have the ability to process and/or analyze the images and/or device data captured, allowing for highlights or hot information to be passed on earlier, such as when a gun shot is detected and an image is capture that direction that image is passed on before others in a queue to allow that information or data to be acted on quickly.

There can be different types of apparatus, and/or systems utilized for surveillance. For example, a vehicle 110, such as but not limited to a pickup, Sport Utility Vehicle (SUV), car, Utility Vehicle (UTV), or other powered apparatuses capable of movement can be utilized in various surveillance operations. These types of vehicle can operate on multiple types of fuels, such as but not limited to carbon based fuels, unleaded gasoline, leaded gasoline, diesel, electric, hydrogen, propane, natural gas, biofuels, and other types of combustible or energy generation systems.

These vehicles 110 can incorporate various types of surveillance equipment including a portable computing device 112, a portable License Plate Reader (LPR) kit 114, in-Car Computing device(s) 116, and/or a toolbox 150. These can be utilized on and/or within the vehicle 110 in a manner that would allow for monitoring of activities within and/or around the vehicle 110. In some cases, that may mean as other vehicles are passing the vehicle 110, or while the vehicle 110 is traveling. Additionally, a trailer 130 may be pulled and/or towed to a location using the vehicle 110. The trailer 130 can allow for additional surveillance alone and/or in combination with the vehicle 110.

The portable computing device 112 can allow for surveillance devices to be monitored, and/or controlled without a constant connection to the surveillance devices. A portable LPR kit 114 can allow for the detection and/or reading of license plates on vehicles in close or in some examples distant proximity to the portable LPR kit 114 and any imaging systems. An in-car computing device 116 may also be utilized to connect to, control, or communicate with surveillance devices and/or other computing devices.

A trailer 130 may be pulled or towed to a specific location to allow for additional surveillance, observation of specific activities, and/or to provide guidance to pedestrians or vehicles. While a trailer 130 coupled to a vehicle 110 or other power source may allow for computing devices, signage, lighting, imaging systems, and other sensors or apparatuses to be utilized in conjunction with the trailer 130. In some examples, a generator 132 may be coupled to the trailer 130 and allow for power to be supplied to items coupled to, connected to, stored on, and/or associated with the trailer 130. In at least one example, the generator 132 can be mounted to the trailer 130 through a mounting and engagement system, such as but not limited to a trailer receiver (mount) and a trailer hitch (engagement).

A mounting system 134 can allow for an imaging system 136 and/or other sensors or devices to be coupled to the trailer 130. The mounting system 134 may include, but is not limited to ball mountings, pin mounts, magnetic mounts, combination mounts, and/or other mounting system. The imaging system 136 can include LPR, Infrared, Night Vision, thermal, optical sensor, video, and/or other types of images or device sensors available. In at least one example, a device sensor may include the ability to detect wireless signals such as Wifi, Bluetooth, Zigbee, or other commercially available systems.

A portable mast 140 may be used in conjunction with a vehicle 110, a trailer 130, or be stand alone. In some examples, the portable mast 140 can be utilized to allow for a portable imaging system 142 or other detection or device sensors.

A toolbox 150 can allow for a vehicle 110 or other apparatus such as a trailer 130 to be utilized for covert or non-covert surveillance. The toolbox 150 may include a cooling system 152 that allow a computing device or hidden imaging system 154 to be cooled and/or not overheat, thereby assisting to minimize risk of the devices overheating or other damage. A master wiring harness 156 may be utilized to couple the toolbox 150, its stored or housed items, or other devices to a computing device such as the portable computing device 112 or other systems such as an in-car computing device 116.

Figure 2:
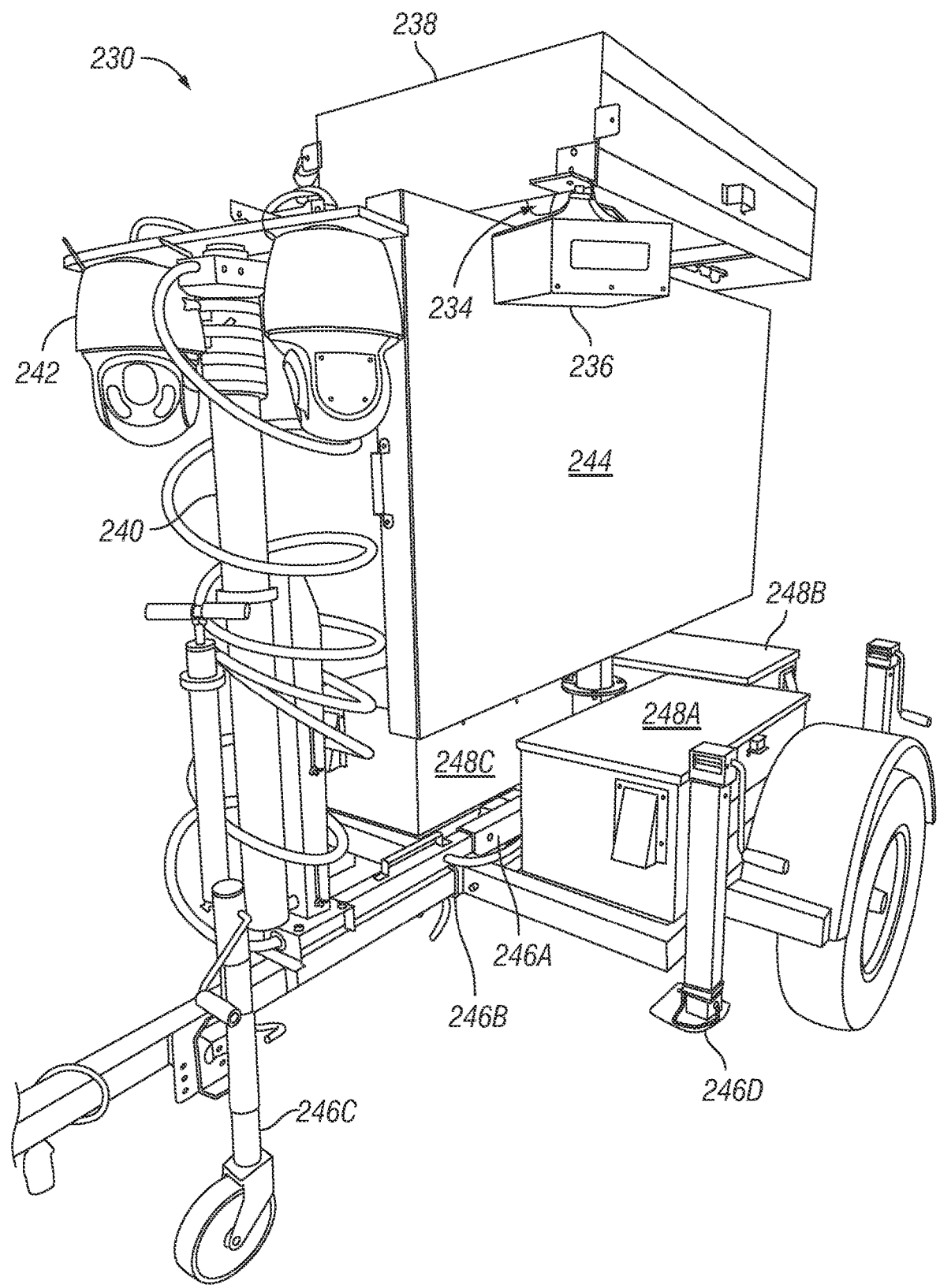
FIG. 2 is an illustration of a trailer.

FIG. 2 is an illustration of trailer 230. The trailer 230 can be utilized for many different surveillance or informational purposes. For example, a digital sign 244 may be utilized to provide information to motorists, vehicles, or pedestrians passing by or near the trailer 230. In other examples, the trailer 230 may be used for traffic enforcement or monitoring purposes, to allow municipalities to determine if changes to their regulations are needed. To achieve the monitoring there can be multiple forms of imaging system(s) 236 utilized. For example, the imaging system 236 may include License Plate Recognition or Reader systems, infrared imaging systems, thermal imaging systems, optical sensors, digital sensors, and/or other types of devices or systems that allow for images to be created. In some examples, this sensors or systems may be digital or a combination of digital, optical, and/or analog components that allow for an image or other viewable asset to be created, processed, and/or stored. To highlight a few of these, infrared or thermal imaging allows for images to be captured in low light conditions, fog, smoke, or other conditions via the heat or infrared signal generated by an object. LPR systems may incorporate optical character recognition (OCR) to determine and/or read the characters on a license plate.

The imaging system 236 may be coupled to the trailer 230 through a mounting or bracket system 234. These can include various types of ball, receivers, tongue and grove, dovetail, and/or other types or forms of adjustable engagement. The imaging system 236 may be used in conjunction with signage or sensors to allow for the detection of those violating regulations or laws. For example, a smog, oxygen, or other environmental sensor may be used in conjunction with an imaging system 236 to allow for the detection of those that might be in violation of environmental or pollution laws or regulations.

An energy storage system 238 allows for energy to be captured and/or stored on or within the trailer 230. In particular, a solar panel array (one or more, and in some examples three or more), can be stored as part of a moveable cabinet that allows the panels to be slid out (deployed) when the trailer 230 is stationary. This energy storage system 238 may also include one or more batteries or other forms of energy storage within portions of the trailer 230. For example, the solar panel array may be coupled to one or more batteries that supply power and energy to the imaging system 236 or other computing or processing devices. In some examples, the batteries may be stored in one of the storage device(s) 248A, 248B, or 248C (collectively storage devices 248).

A portable mast 240 may be utilized in conjunction with the trailer 230 to allow for additional surveillance and/or portable imaging system(s) 242. The portable imaging system 242 may include license plate recognition or reader systems, infrared imaging systems, thermal imaging systems, optical sensors, digital sensors, and/or other types of devices or systems that allow for images to be created. In some examples, these sensors or systems may be digital or a combination of digital, optical, and/or analog components that allow for an image or other viewable asset to be created, processed, and/or stored. The portable mast 240 can allow for additional surveillance sensors or devices to be utilized in an elevated manner above a trailer 230. The portable mast 240 may be engaged with the trailer 230 through a mounting device 246A. The mounting device 246A may be in some examples a trailer hitch receiver to receive various sizes of tubing (often a square tubing ranging between 1 inch and 3 inches in width and height). The portable mast 240 can have a corresponding engagement section (not illustrated) that can be inserted into the mounting device 246A. In some examples, the portable mast 240 may be transferred from the trailer 230 to a vehicle (not illustrated) or a stand that allows for free-standing use. It would be understood, that there may be multiple mounting device(s) on the front of the trailer 230, as well as the rear of the trailer 230. In some examples, there can be three or more mounting devices on the front side of the trailer and two or more on the rear side of the trailer. While in other examples, there may be one or two mounting devices on the front and rear of the trailer 230.

A similar mounting device 246B may be utilized to receive a trailer hitch or other portable system or device. The mounting device 246B may be, in some examples, a trailer hitch receiver to receive various sizes of tubing (often a square tubing ranging between 1 inch and 3 inches in width and height). The trailer hitch device may include a trailer tongue (extension that allows the main part of the trailer to be offset from the vehicle by a determined distance) and/or a trailer coupler that can receive a trailer or hitch ball that can be coupled to a vehicle. Other forms of trailer balls or couples may also be utilized to allow for the coupling of the trailer 230 to a vehicle. In at least one embodiment, the trailer coupler can be removed to prevent access or movement of the trailer 230 when it is not in a towing or moving operation. A support device 246C and/or a multi-point support device 246D may include, but is not limited to, a trailer jack or jack stands. In at least one example, the support device 246C is a trailer jack that can have a wheel at the end that is distal from the trailer 230, while the multi-point support device 246D may have a jack plate that can be engaged with a ground surface to assist in leveling or supporting the trailer 230.

Figure 3A:
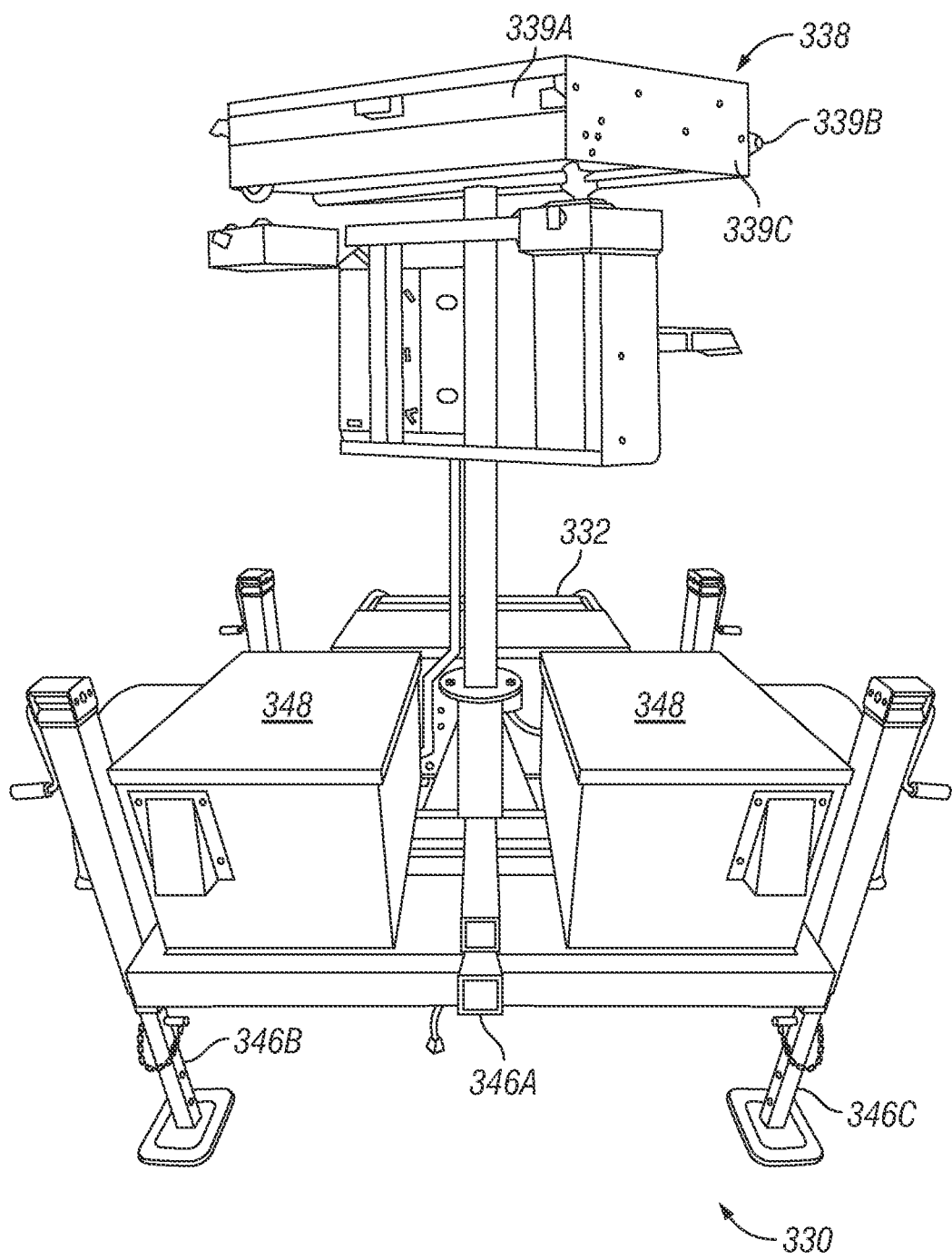
FIG. 3A is a rear view illustration of a trailer.

FIG. 3A is a rear view illustration of a trailer 330. The trailer 330 can have support multiple methods of surveillance. For example, there can be imaging system(s) 336 that allow for the surrounding area near the trailer to be observed in real-time or based on delayed storage systems. In some examples, a trailer 330 may include a toolbox (not illustrated) that allows for imaging and/or networking communication systems to be utilized. While in other examples, the storage device(s) 348 can allow for the storage of communication and/or networking systems. Similarly, the storage devices 348 may also include storage for energy storage such as but not limited to batteries or other energy or power storage or control systems.

An energy storage system 338 may be included as part of the trailer 330. In at least one example, this may include a solar array 339A and 339B included as part of a solar panel cabinet or slide system 339C. In at least one embodiment, the trailer 330 can have a post that allows for the solar panel cabinet 339C to be mounted on to allow for energy to be collected and/or stored for use by other components of the trailer 330. While the energy storage system 338 allows for renewable energy generation, there are times when that is not available or energy storage will limit the usability of the trailer 330 or its surveillance systems. Thus, a generator 332 may be included to allow for various surveillance systems to be utilized even when there is no energy storage present. In some examples, the generator 332 may be utilized in conjunction with a generator rack that can mount to a mounting device that is part of the trailer 330.

The support device 346A may be, in some examples, a trailer hitch receiver to receive various sizes of tubing (often a square tubing ranging between 1 inch and 3 inches in width and height). The trailer hitch device may include a trailer tongue (extension that allows the main part of the trailer to be offset from the vehicle by a determined distance) and/or a trailer coupler that can receive a trailer or hitch ball that can be coupled to a vehicle. Other forms of trailer balls or couples may also be utilized to allow for the coupling of the trailer 330 to a vehicle. In at least one embodiment, the trailer coupler can be removed to prevent access or movement of the trailer 330 when it is not in a towing or moving operation. A multi-point support device 346B/346C/346D may include, but is not limited to, a trailer jack or jack stands. In at least one example, the support device 346A is a trailer jack that can have a wheel at the end that is distal from the trailer 330, while the multi-point support device 346B/346C/346D may have a jack plate that can be engaged with a ground surface to assist in leveling or supporting the trailer 330.

Figure 3B:
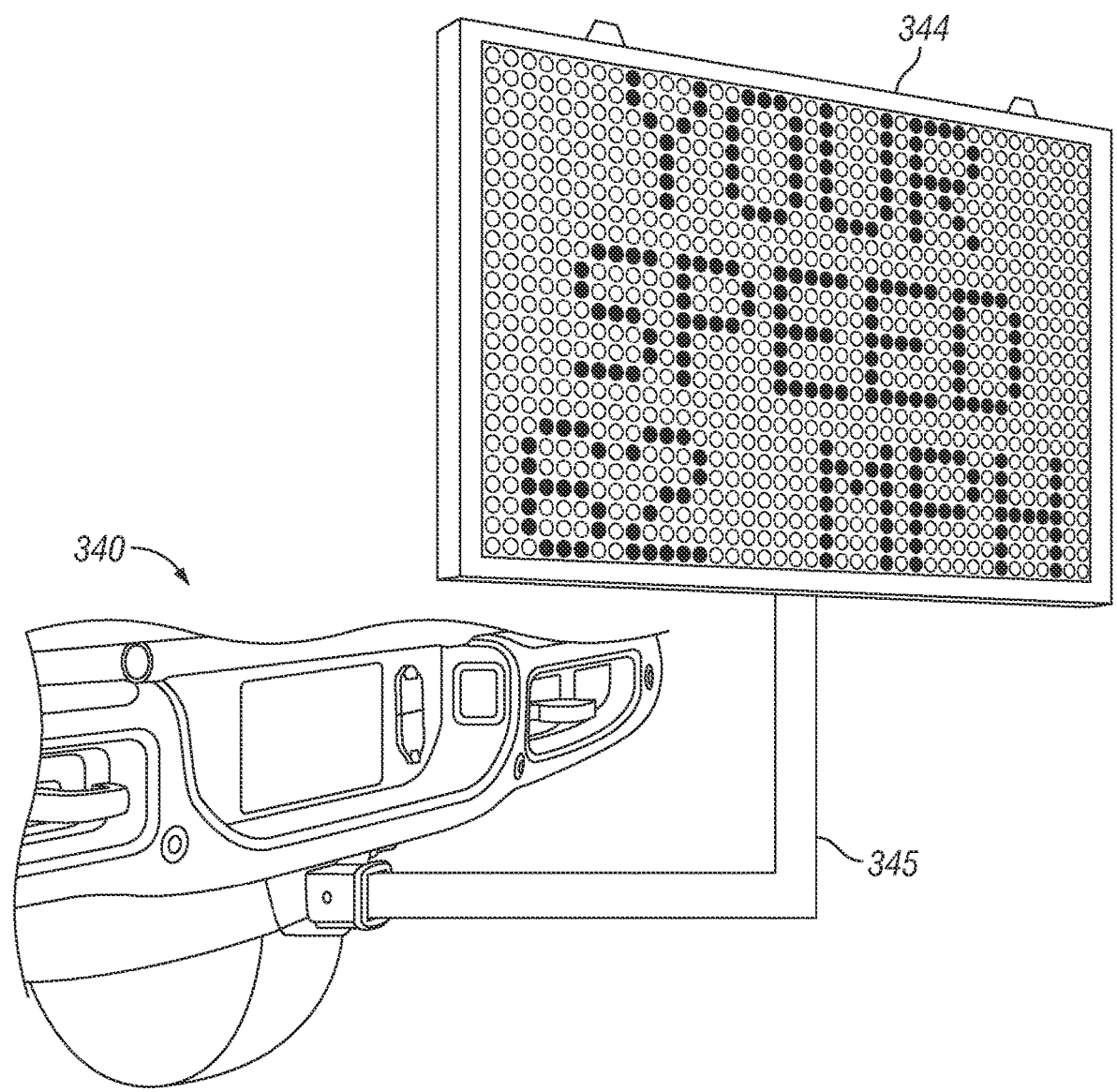
FIG. 3B is an illustration of a digital sign coupled to a vehicle through an engagement system.

FIG. 3B is an illustration of a digital sign 344 coupled to a vehicle 310 through an engagement system 345. A digital sign 344 can allow for passing vehicles or pedestrians to know information that law enforcement or other authorities may need to pass along to individuals. The digital sign 344 may utilize Light Emitting Diodes, Liquid Crystal Display, Organic Light Emitting Diodes, short throw projection, plasma, or other display technologies that allow for information to be presented. The resolutions can vary for the digital sign 344, but in at least one example, it may be 720, 1080, 4 k, 8 k, HDR and/or other resolutions that come out that allow for the readability of the sign. Additionally, the digital sign or display 344, may be coupled to a computing device that allows for content management or media playing systems to allow for the displaying of digital information. In some examples, the digital sign 344 may be coupled via network connection to a remote computing device as well to allow for information to be displayed. While interactivity is not required, it is possible that the digital sign 344 coupled be a touch screen or have an integrated human interface system that allows for a user to interact with the information provided, like a map or other information that can be scrolled or is too large for display on the visible portion of the digital display 344. Sensors integrated into the digital sign 344 or coupled to it via a computing device may allow for the brightness of the display or information provided to be changed without human intervention. Similarly, there may be audio systems coupled to the digital sign 344 that allow for audio content to be provided in conjunction with any displayed information.

Figure 3C:
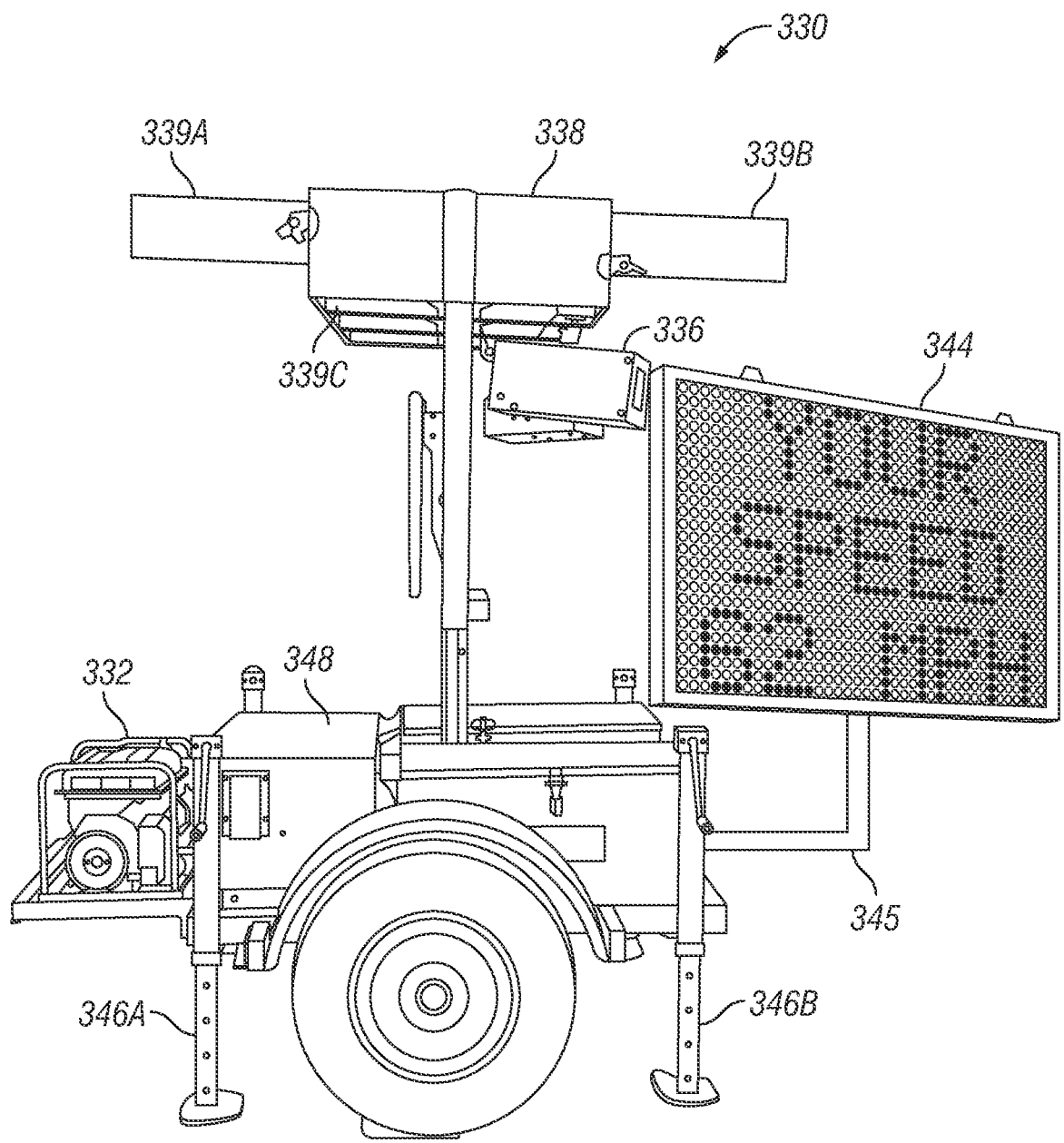
FIG. 3C is an illustration of a trailer without a mounting system.

FIG. 3C is an illustration of a trailer 330 without a mounting system (not illustrated). The trailer 330 can have support multiple methods of surveillance. For example, there can be imaging system(s) 336 that allow for the surrounding area near the trailer to be observed in real-time or based on delayed storage systems. In some examples, a trailer 330 may include a toolbox (not illustrated) that allows for imaging and/or networking communication systems to be utilized. While in other examples, the storage device(s) 348A or 348B (first and second storage devices 348 collectively) can allow for the storage of communication and/or networking systems. Similarly, the storage devices 348 may also include storage for energy storage such as but not limited to batteries or other energy or power storage or control systems.

An energy storage system 338 may be included as part of the trailer 330. In at least one example, this may include a solar array 339A and 339B included as part of a solar panel cabinet or slide system 339C. In at least one embodiment, the trailer 330 can have a post that allows for the solar panel cabinet 339C to be mounted on to allow for energy to be collected and/or stored for use by other components of the trailer 330. While, the energy storage system 338 allows for renewable energy generation, there are times when that is not available or energy storage will limit the usability of the trailer 330 or its surveillance systems. Thus, a generator 332 may be included to allow for various surveillance systems to be utilized even when there is no energy storage present. In some examples, the generator 332 may be utilized in conjunction with a generator rack that can mount to a mounting device that is part of the trailer 330.

In FIG. 3C, the trailer 330 does not have a support device or trailer coupling (trailer tongue) coupled to it, which causes it to have limited towing or pulling capabilities that allow for security. However, the mounting devices (front and back mounting devices) can be utilized for other items, including but not limited to, the generator 332 and/or the digital sign 344, that has an engagement section or system 345. A multi-point support device 346A/346B may include, but is not limited to, a trailer jack or jack stands. In at least one example, the multi-point support device 346A/346B may have a jack plate that can be engaged with a ground surface to assist in leveling or supporting the trailer 330.

Figure 3D:
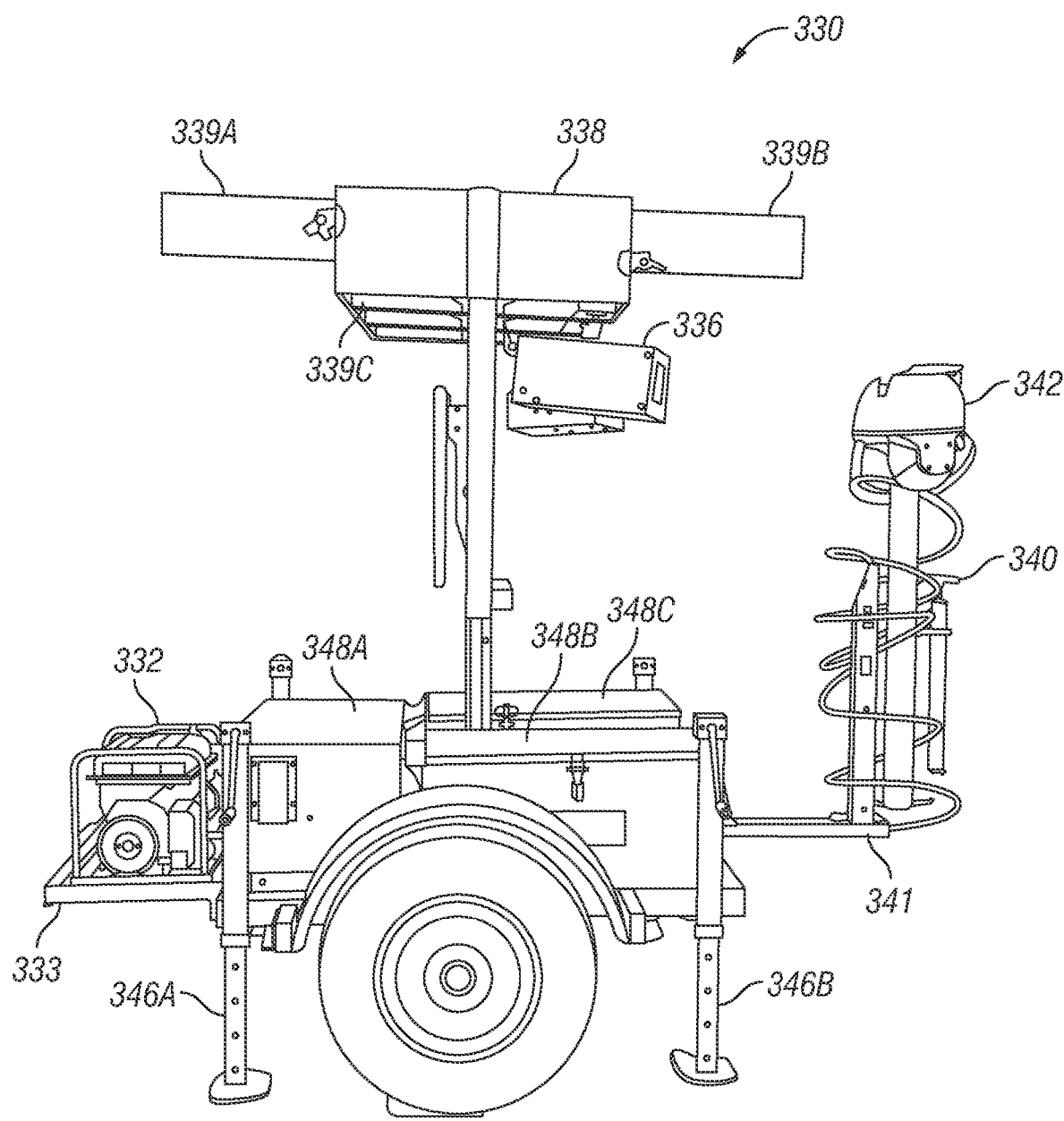
FIG. 3D is an illustration of a different embodiment of a trailer without a mounting system.

FIG. 3D is an illustration of a trailer 330 without a mounting system. The trailer 330 can have support multiple methods of surveillance. For example, there can be imaging system(s) 336 that allow for the surrounding area near the trailer to be observed in real-time or based on delayed storage systems. In some examples, a trailer 330 may include a toolbox (not illustrated) that allows for imaging and/or networking communication systems to be utilized. While in other examples, the storage device(s) 348A or 348B (first and second storage devices 348 collectively) can allow for the storage of communication and/or networking systems. Similarly, the storage devices 348 may also include storage for energy storage such as but not limited to batteries or other energy or power storage or control systems.

An energy storage system 338 may be included as part of the trailer 330. In at least one example, this may include a solar array 339A and 339B included as part of a solar panel cabinet or slide system 339C. In at least one embodiment, the trailer 330 can have a post that allows for the solar panel cabinet 339C to be mounted on to allow for energy to be collected and/or stored for use by other components of the trailer 330. While, the energy storage system 338 allows for renewable energy generation, there are times when that is not available or energy storage will limit the usability of the trailer 330 or its surveillance systems. Thus, a generator 332 may be included to allow for various surveillance systems to be utilized even when there is no energy storage present. In some examples, the generator 332 may be utilized in conjunction with a generator rack or engagement system 333 that can mount to a mounting device that is part of the trailer 330.

In FIG. 3D, the trailer 330 does not have a support device or trailer coupling (trailer tongue) coupled to it, which causes it to have limited towing or pulling capabilities that allow for security. However, the mounting devices (front and back mounting devices) can be utilized for other items, including but not limited to, the generator 332 and/or the portable mast 340, that has an engagement section or system 341. A multi-point support device 346A/346B may include, but is not limited to, a trailer jack or jack stands. In at least one example, the multi-point support device 346A/346B may have a jack plate that can be engaged with a ground surface to assist in leveling or supporting the trailer 330.

A portable mast 340 may be utilized in conjunction with the trailer 330 to allow for additional surveillance and/or portable imaging system(s) 342. The portable imaging system 342 may include License Plate Recognition or Reader systems, infrared imaging systems, thermal imaging systems, optical sensors, digital sensors, and/or other types of devices or systems that allow for images to be created. In some examples, these sensors or systems may be digital or a combination of digital, optical, and/or analog components that allow for an image or other viewable asset to be created, processed, and/or stored. The portable mast 340 can allow for additional surveillance sensors or devices to be utilized in an elevated manner above a trailer 330. The portable mast 340 may be engaged with the trailer 330 through a mounting device. The mounting device may be in some examples a trailer hitch receiver to receive various sizes of tubing (often a square tubing of ranging between 1 inch and 3 inches in width and height). The portable mast 340 can have a corresponding engagement section (not illustrated) that can be inserted into the mounting device. In some examples, the portable mast 340 may be transferred from the trailer 330 to a vehicle (not illustrated) or a stand that allows for free-standing use.

Figure 4A:
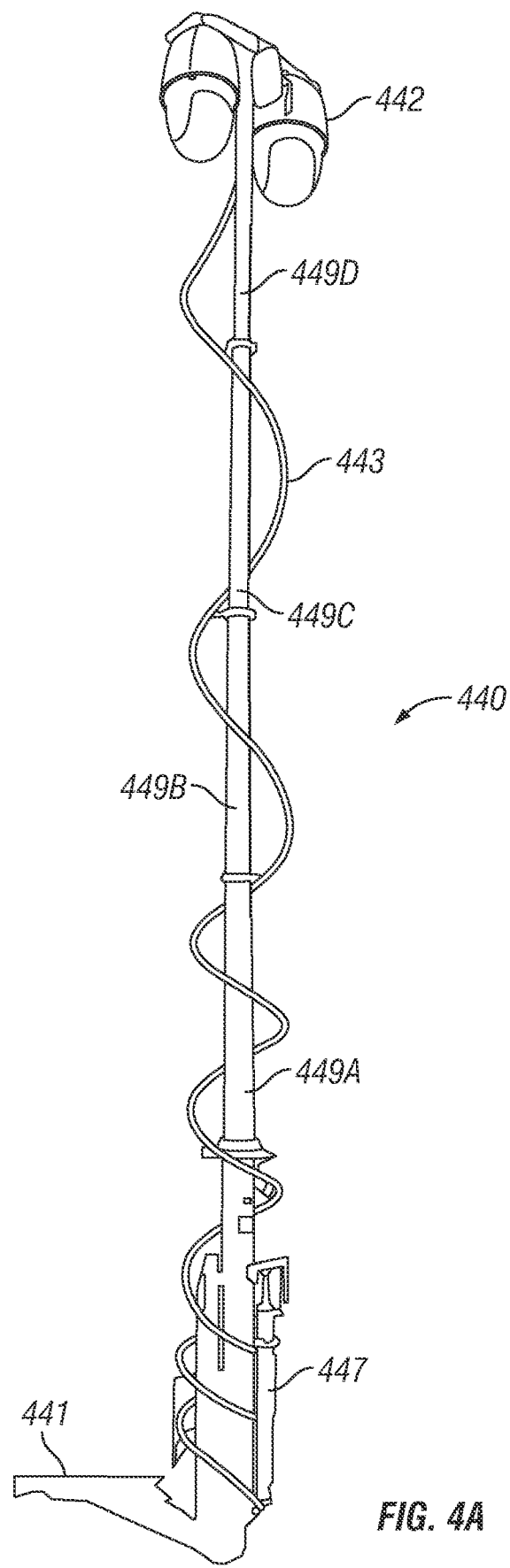
FIG. 4A is an expanded illustration view of a portable mast, with the portable mast engagement system and a portable imaging system.

FIG. 4A is an expanded illustration view of a portable mast 440, with the portable mast engagement system 441 and a portable imaging system 442. A portable mast 440 may be utilized in conjunction with the trailer or vehicle to allow for additional surveillance and/or a portable imaging system(s) 342. The portable mast 440 can include multiple telescoping sections 449A/449B/449C/449D that can collapse into one another in a concentric manner, in at least one example. The portable imaging system 442, coupled to the portable mast 440, may include License Plate Recognition or Reader systems, infrared imaging systems, thermal imaging systems, optical sensors, digital sensors, and/or other types of devices or systems that allow for images to be created. In some examples, these sensors or systems may be digital or a combination of digital, optical, and/or analog components that allow for an image or other viewable asset to be created, processed, and/or stored. Additionally, the portable imaging system 442 may be coupled to a computing device via a cable or connection system 443. The portable mast 440 can allow for additional surveillance sensors or devices to be utilized in an elevated manner above a trailer or vehicle. The portable mast 440 may be engaged with the trailer or vehicle through a mounting device. In at least one embodiment, the mounting device may be in some examples a trailer hitch receiver to receive various sizes of tubing (often a square tubing of ranging between 1 inch and 3 inches in width and height). The portable mast 440 can have a corresponding engagement section 441 that can be inserted into the mounting device. In some examples, the portable mast 440 may be transferred from the trailer to a vehicle (or vise-versa) or a stand that allows for free-standing use. Additionally, a support or flex piston 447 may be utilized to assist with the weight of the portable imaging system 442, which is distal from the support or flex piston 447.

Figure 4B:
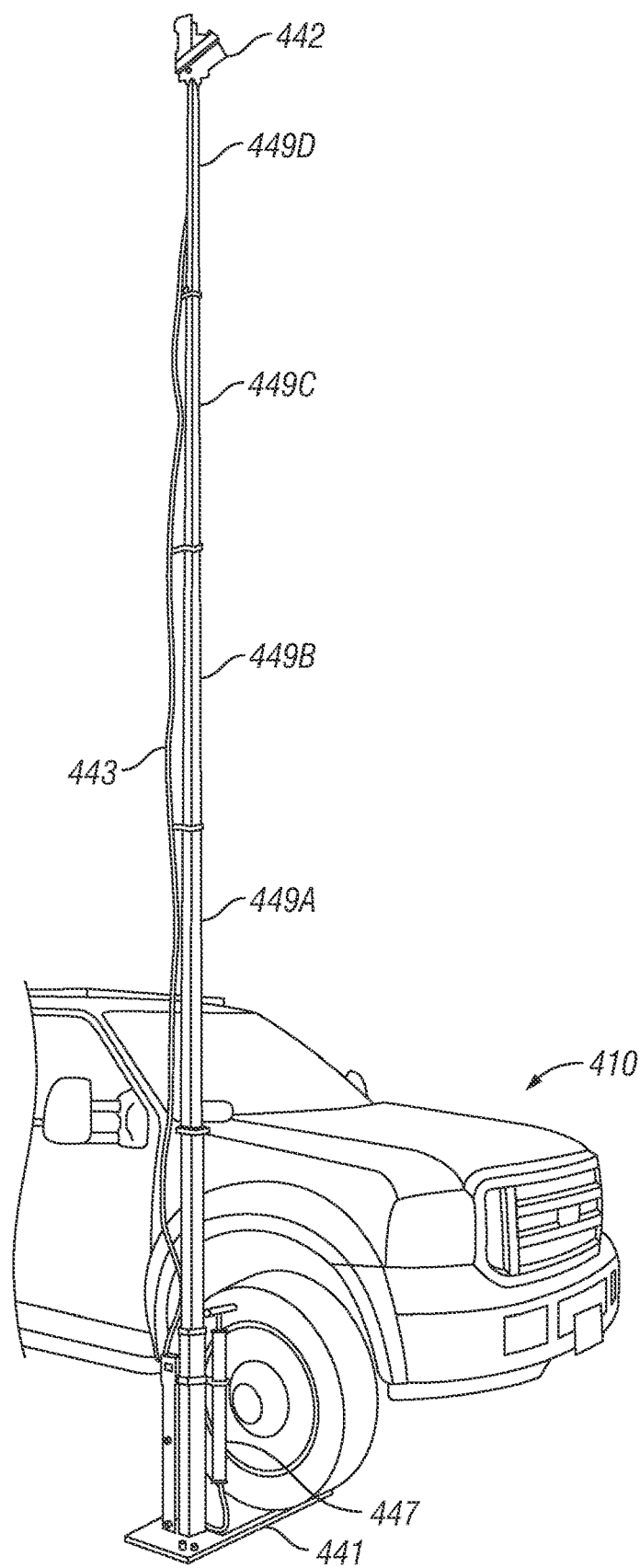
FIG. 4B is an expanded illustration view of a portable mast 440, with the portable mast engagement system and a portable imaging system engaged with a vehicle.

FIG. 4B is an expanded illustration view of a portable mast 440, with the portable mast engagement system 441 and a portable imaging system 442 engaged with a vehicle 410. A portable mast 440 may be utilized in conjunction with the trailer or vehicle to allow for additional surveillance and/or a portable imaging system(s) 342. The portable mast 440 can include multiple telescoping sections 449A/449B/449C/449D that can collapse into one another in a concentric manner, in at least one example. The portable imaging system 442, coupled to the portable mast 440, may include License Plate Recognition or Reader systems, infrared imaging systems, thermal imaging systems, optical sensors, digital sensors, and/or other types of devices or systems that allow for images to be created. In some examples, these sensors or systems may be digital or a combination of digital, optical, and/or analog components that allow for an image or other viewable asset to be created, processed, and/or stored. The portable mast 440 can allow for additional surveillance sensors or devices to be utilized in an elevated manner above a trailer or vehicle. The portable mast 440 may be engaged with the trailer or vehicle through a support device or engagement section 441 that can be driven over with a vehicle or be a free standing support system similar in configuration as a tripod. In some examples, the portable mast 440 may be transferred from the trailer to a vehicle (or vise-versa) by swapping the engagement section for an engagement system that can be coupled to a trailer or vehicle. Additionally, a support or flex piston 447 may be utilized to assist with the weight of the portable imaging system 442, which is distal from the support or flex piston 447.

Figure 4C:
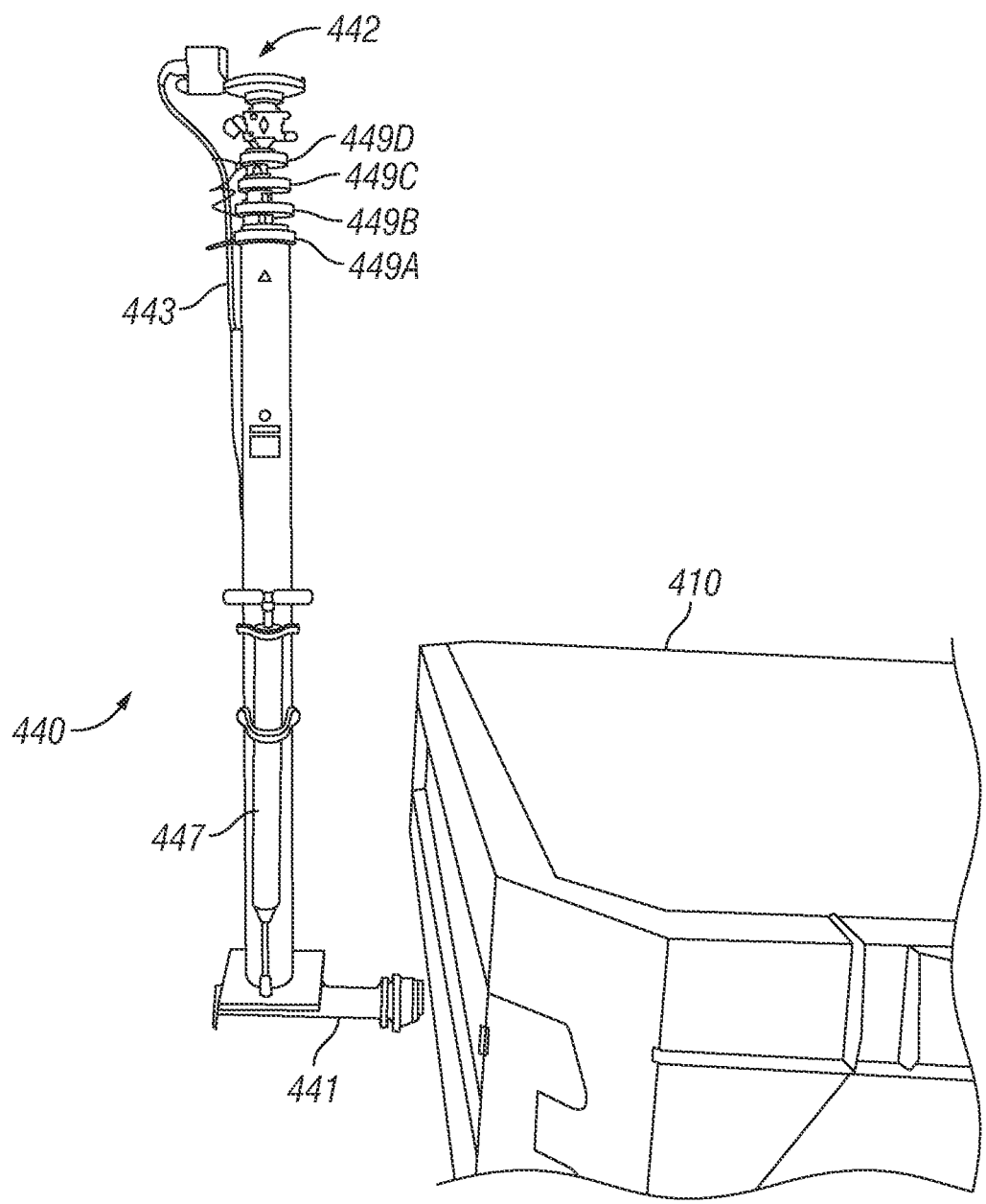
FIG. 4C is an expanded illustration view of a portable mast, with the portable mast engagement system and a portable imaging system engaged with a vehicle 410.

FIG. 4C provides a different expanded illustration view of a portable mast 440, with the portable mast engagement system 441 and a portable imaging system 442 engaged with a vehicle 410. A portable mast 440 may be utilized in conjunction with the trailer or vehicle 410 to allow for additional surveillance and/or a portable imaging system(s) 342, and is shown in this figure in a collapse or closed position or state. The portable mast 440 can include multiple telescoping sections 449A/449B/449C/449D that can collapse into one another in a concentric manner, in at least one example. The portable imaging system 442, coupled to the portable mast 440, may include License Plate Recognition or Reader systems, infrared imaging systems, thermal imaging systems, optical sensors, digital sensors, and/or other types of devices or systems that allow for images to be created. In some examples, these sensors or systems may be digital or a combination of digital, optical, and/or analog components that allow for an image or other viewable asset to be created, processed, and/or stored. Additionally, the portable imaging system 442 may be coupled to a computing device via a cable or connection system 443. The portable mast 440 can allow for additional surveillance sensors or devices to be utilized in an elevated manner above a trailer or vehicle. The portable mast 440 may be engaged with the trailer or vehicle through a mounting device. In at least one embodiment, the mounting device may be in some examples a trailer hitch receiver to receive various sizes of tubing (often a square tubing of ranging between 1 inch and 3 inches in width and height). The portable mast 440 can have a corresponding engagement section 441 that can be inserted into the mounting device. In some examples, the portable mast 440 may be transferred from the trailer to a vehicle (or vise-versa) or a stand that allows for free-standing use. Additionally, a support or flex piston 447 may be utilized to assist with the weight of the portable imaging system 442, which is distal from the support or flex piston 447.

Figure 4D:
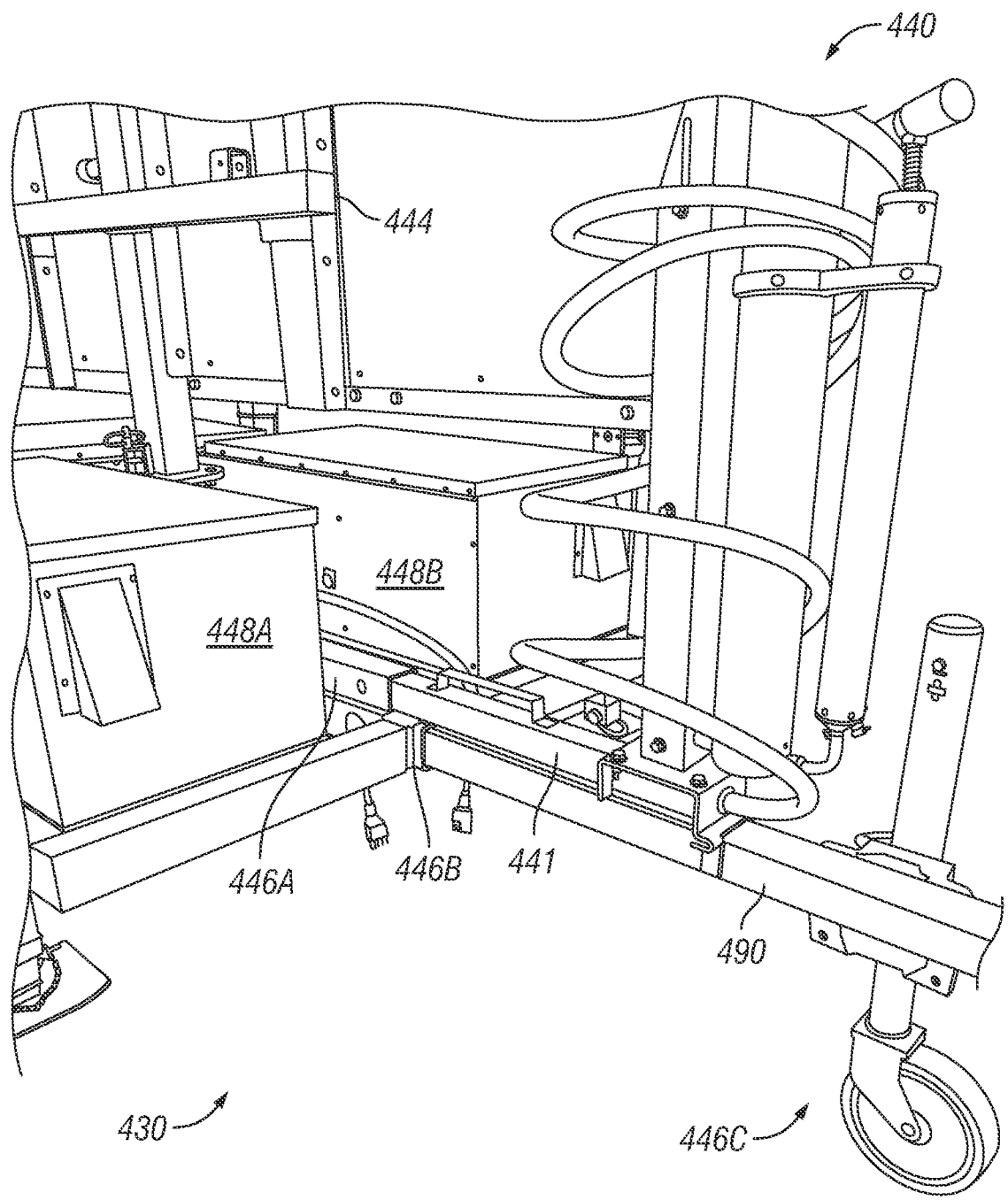
FIG. 4D is another illustration view of trailer with a portable mast.

FIG. 4D is another illustration view of trailer 430 with a portable mast 440. The trailer 430 can be utilized for many different surveillance or informational purposes. For example, a digital sign 444 may be utilized to provide information to motorists, vehicles, or pedestrians passing by or near the trailer 430. In other examples, the trailer 430 may be used for traffic enforcement or monitoring purposes, to allow municipalities to determine if changes to their regulations are needed. The monitoring system may be utilized using computing devices, as well as energy storage and/or power control system that can be stored or housed in one of the storage device(s) 448A, or 448B (collectively storage devices 448).

A portable mast 440 may be utilized in conjunction with the trailer 430 to allow for additional surveillance and/or portable imaging system(s). The portable imaging system may include License Plate Recognition or Reader systems, infrared imaging systems, thermal imaging systems, optical sensors, digital sensors, and/or other types of devices or systems that allow for images to be created. In some examples, this sensors or systems may be digital or a combination of digital, optical, and/or analog components that allow for an image or other viewable asset to be created, processed, and/or stored. The portable mast 440 can allow for additional surveillance sensors or devices to be utilized in an elevated manner above a trailer 430. The portable mast 440 may be engaged with the trailer 230 through a mounting device 446A. The mounting device 446A may be in some examples a trailer hitch receiver to receive various sizes of tubing (often a square tubing of ranging between 1 inch and 3 inches in width and height). The portable mast 440 can have a corresponding engagement section 441 that can be inserted into the mounting device 446A. In some examples, the portable mast 440 may be transferred from the trailer 430 to a vehicle (not illustrated) or a stand that allows for free-standing use.

A similar mounting device 446B may be utilized to receive a trailer hitch or other portable system or device. The mounting device 446B may be in some examples a trailer hitch receiver to receive various sizes of tubing (often a square tubing of ranging between 1 inch and 3 inches in width and height). The trailer hitch device may include a trailer tongue 490 (extension that allows the main part of the trailer to be offset from the vehicle by a determined distance) and/or a trailer coupler that can receive a trailer or hitch ball that can be coupled to a vehicle. Other forms of trailer balls or couples may also be utilized to allow for the coupling of the trailer 430 to a vehicle. In at least one embodiment, the trailer coupler can be removed to prevent access or movement of the trailer 430 when it is not in a towing or moving operation. A support device 446C may include, but is not limited to, a trailer jack or jack stands. In at least one example, the support device 446C is a trailer jack that can have a wheel at the end that is distal from the trailer 430.

Figure 5B:
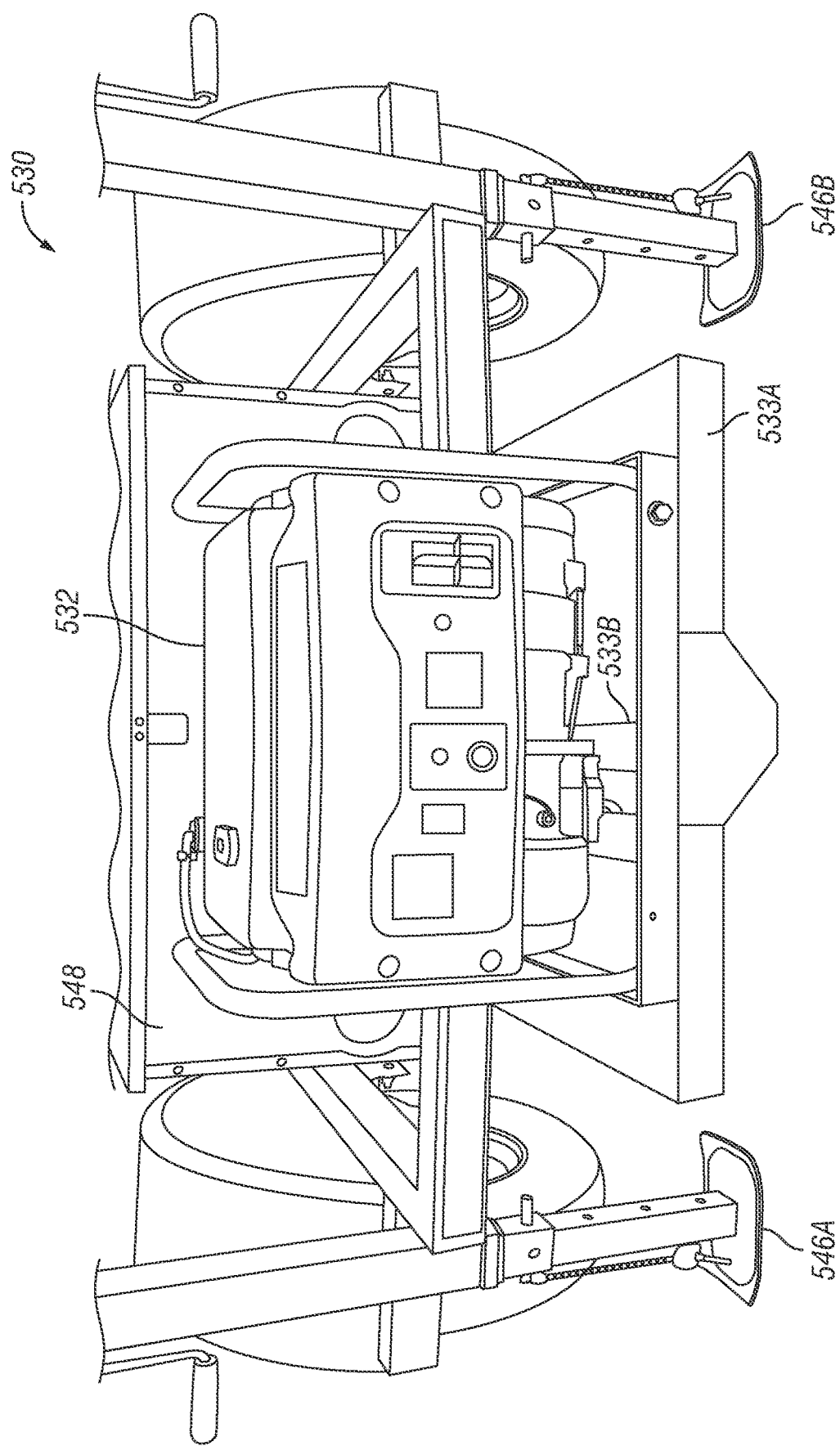
FIG. 5B is an illustration of a trailer.

FIGS. 5A and 5B provide further illustrations of a trailer 530. These illustrations depict possible embodiments and different perspectives of a generator 532, a generator engagement system 533, a mounting device 546A, a second mounting device 546B, a support device 546C, and a storage device 548. FIG. 5A is an illustration of a trailer 530. The trailer 530 can have support multiple methods of surveillance. For example, there can be imaging system(s) that allow for the surrounding area near the trailer to be observed in real-time or based on delayed storage systems. In some examples, a trailer 530 may include a toolbox (not illustrated) that allows for imaging and/or networking communication systems to be utilized. While in other examples, the storage device(s) 548 can allow for the storage of communication and/or networking systems. Similarly, the storage devices 548 may also include storage for energy storage such as but not limited to batteries or other energy or power storage or control systems.

While an energy storage system (not illustrated) can allow for renewable energy generation, there are times when that is not available or energy storage will limit the usability of the trailer 530 or its surveillance systems. Thus, a generator 532 may be included to allow for various surveillance systems to be utilized even when there is no energy storage present. In some examples, the generator 532 may be utilized in conjunction with a generator rack or engagement system 533 that can mount to a mounting device that is part of the trailer 530. The mounting devices (front and back mounting devices shown as 546A) can be utilized for other items, including but not limited to, the generator 532 that has an engagement section 533. A multi-point support device 546B may include, but is not limited to, a trailer jack or jack stands. In at least one example, the multi-point support device 546B may have a jack plate that can be engaged with a ground surface to assist in leveling or supporting the trailer 530.

FIG. 5B is an illustration of a trailer 530. The trailer 530 can have support multiple methods of surveillance. For example, there can be imaging system(s) that allow for the surrounding area near the trailer to be observed in real-time or based on delayed storage systems. In some examples, a trailer 530 may include a toolbox (not illustrated) that allows for imaging and/or networking communication systems to be utilized. While in other examples, the storage device(s) 548 can allow for the storage of communication and/or networking systems. Similarly, the storage devices 548 may also include storage for energy storage such as but not limited to batteries or other energy or power storage or control systems.

While an energy storage system (not illustrated) can allow for renewable energy generation, there are times when that is not available or energy storage will limit the usability of the trailer 530 or its surveillance systems. Thus, a generator 532 may be included to allow for various surveillance systems to be utilized even when there is no energy storage present. In some examples, the generator 532 may be utilized in conjunction with a generator rack or engagement system, having an engagement frame 533A, and support beam(s) 533B, that can mount to a mounting device that is part of the trailer 530. A multi-point support device 546B may include, but is not limited to, a trailer jack or jack stands. In at least one example, the multi-point support device 546B may have a jack plate that can be engaged with a ground surface to assist in leveling or supporting the trailer 530.

FIG. 6 is an illustration of multiple mounting devices 634 consistent with the embodiments described above, these mounting devices may be combined and/or modified to allow for interaction or engagement with one another. There are many various mounting devices 634 that can be utilized with the surveillance systems disclosed herein. A mounting ball 635A can allow for imaging systems or sensors to be rotated in many directions, and can be used in conjunction with a mounting block and clamp 635B in some examples. The block and clamp 635B can be used to fix a device in a position relative to the mounting ball 635A. Other mounts such as an adjustable vertical mount 635C, non-adjustable vertical mount 635D, horizontal pole mount 635E, and/or pole arm 635G may incorporate various portions discussed within U.S. Pat. No. 11,184,588 that is hereby incorporated by reference in its entirety, and utilize the mounting ball 635A. A ceiling and wall mount 635F may allow for a reenforced positioning of a mount. The universal plates, extended universal base plate 635H, standard universal base plate 635J, and 2 magnet universal base plate 635L may include items from U.S. Pat. Nos. D856,780; D872,559; D897,821 and that are hereby incorporated by reference in their entirety, along with its continuations and divisionals. These universal mounts allow for the magnet to couple to materials that allow for a proper positioning of a surveillance system. A trunk mount 635I, truck bed mount 635K, bumper mount 635M, and/or roof mount 635N may allow for surveillance system to be utilized with vehicles or other specific placements. An aiming disk 635P allows for a surveillance system to be aimed in relation to many of these mounts, and can be used in conjunction with the mounting ball 635A to position the surveillance system for proper observation and/or detection.

Figure 7:
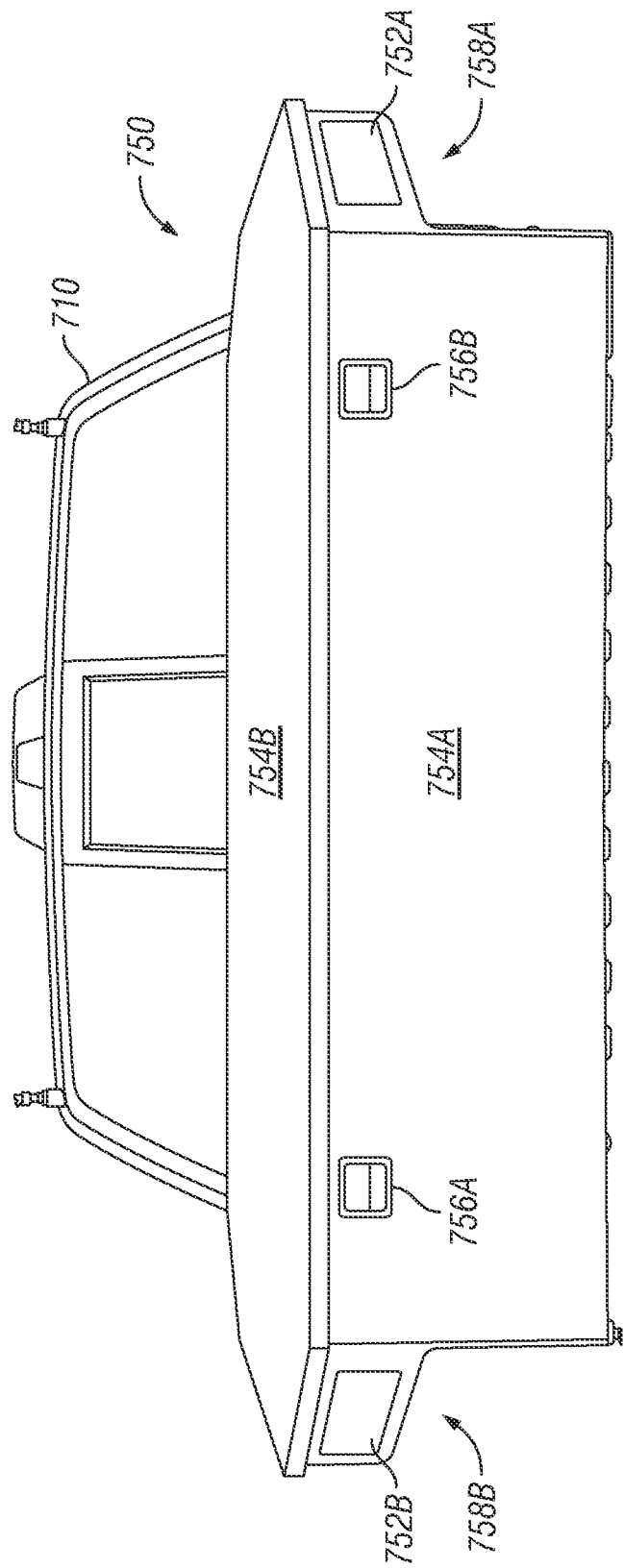
FIG. 7 is an illustration of a toolbox 750 used in a surveillance operation via a vehicle imaging apertures.

FIG. 7 is an illustration of a toolbox 750 used in a surveillance operation via a vehicle 710. The toolbox 750 may allow for the covert surveillance of vehicles, pedestrians, and nearby activities without the visible surveillance of a trailer and/or portable camera systems. In at least one embodiment, the toolbox 750 can have imaging apertures 752A and/or second imaging aperture 752B (collectively imaging apertures 752). The imaging apertures 752 can be clear, opaque, passable with only infrared, allowing for different levels of the visible and non-visible spectrum to pass through. In some examples, the imaging apertures 752 may be clear plastic, glass, or other material, metal, or other material that may be same color as the toolbox 750. There may be multiple imaging apertures 752 along the sides or wings of the toolbox 750.

The toolbox 750 can have multiple sides, including, but not limited to, a main body or housing 754A, a removable top 754B, a first imaging wing 758A, and/or a second imaging wing 758B. The imaging wings may be collectively referenced as imaging wing(s) 758. The main body 754A may have a first latch 756A and/or a second latch 756B (collectively latches 756) that can secure the removable top 754B to the main body 754A. In at least one example, the imaging wing(s) 758 can be positioned in a manner that allows, if used in a pickup or similar vehicle, the imaging systems to have visible access to the nearby area. The imaging apertures 752 can be along the edges of the imaging wing(s) 758. In some examples, the removable top 754B may include a solar panel or other energy generation.

Figure 8A:
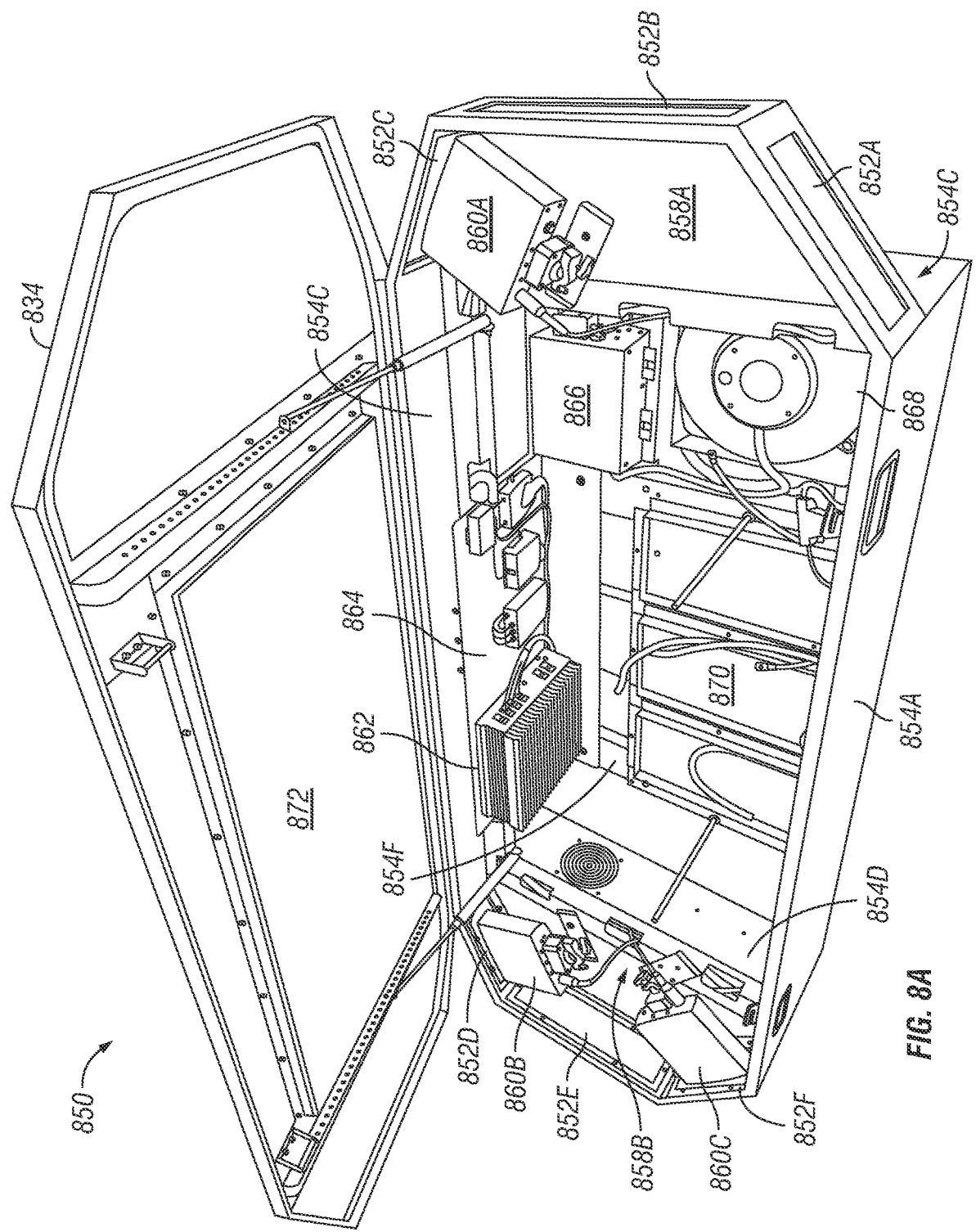
FIG. 8A is an illustration of an open toolbox.

FIG. 8A is an illustration of an open toolbox 850. The toolbox 850 may allow for the covert surveillance of vehicles, pedestrians, and nearby activities without the visible surveillance of a trailer and/or portable camera systems. In at least one embodiment, the toolbox 850. The toolbox 850 may have multiple sides included a front side 854A, a back side 854C, a right side 854D, a left side 854E, a bottom 854F, and a removeable top 854B. The right and/or left sides may each include an imaging wing 858A/858B (collectively imaging wing 858). In at least one embodiment, the imaging wing(s) 858 or right or left side(s) 854D/854E may have imaging apertures 852A/852B/852C/852D/852E and/or 852F (collectively imaging apertures 852). The imaging apertures 852 can be clear, opaque, passable with only infrared, allowing for different levels of the visible and non-visible spectrum to pass through. In some examples, the imaging apertures 852 may be clear plastic, glass, or other material, metal, or other material that may be the same color as the toolbox 850. In FIG. 8A, the imaging apertures 852A and 852C are illustrated as clear, while the imaging aperture 852E is illustrated as opaque. There can be filters that cover or fit within the imaging apertures 852. These can include but are not limited to, IR-transmitting polycarbonate or glass, smoked (partially opaque) polycarbonate or glass, clear polycarbonate or glass, or non-transmitting metal. The imaging apertures 852 allow imaging system(s) 860A/860B/860C (collectively imaging system 860) to capture images, video, and/or other assets or media that can be processed, stored, and/or transmitted.

In at least one example, the imaging wing(s) 858 can be positioned in a manner that allows, if used in a pickup or similar vehicle, the imaging systems to have visible access to the nearby area. The imaging apertures 852 can be along the edges of the imaging wing(s) 858. In some examples, the removable top 854B may include a solar panel or other energy generation. An energy storage system 870 may include batteries or other energy storage that can be coupled to a vehicle or other power source through a power control system 866. The power control system 866 may provide the ability to step up or down voltage or current to meet the needs of the items within the toolbox 850. These items may, but are not limited to, a computing device 862 that may be utilized to control, process, and/or store images, video or other media or assets from the imaging system(s) 860. The computing device 862 may connect to a set of networking devices 864 that allows the computing device 864 and/or imaging systems 860 to connect with remote computing devices or control systems. These items can all be coupled together with a wiring unit 868 that can allow for coupling.

Figure 8B:
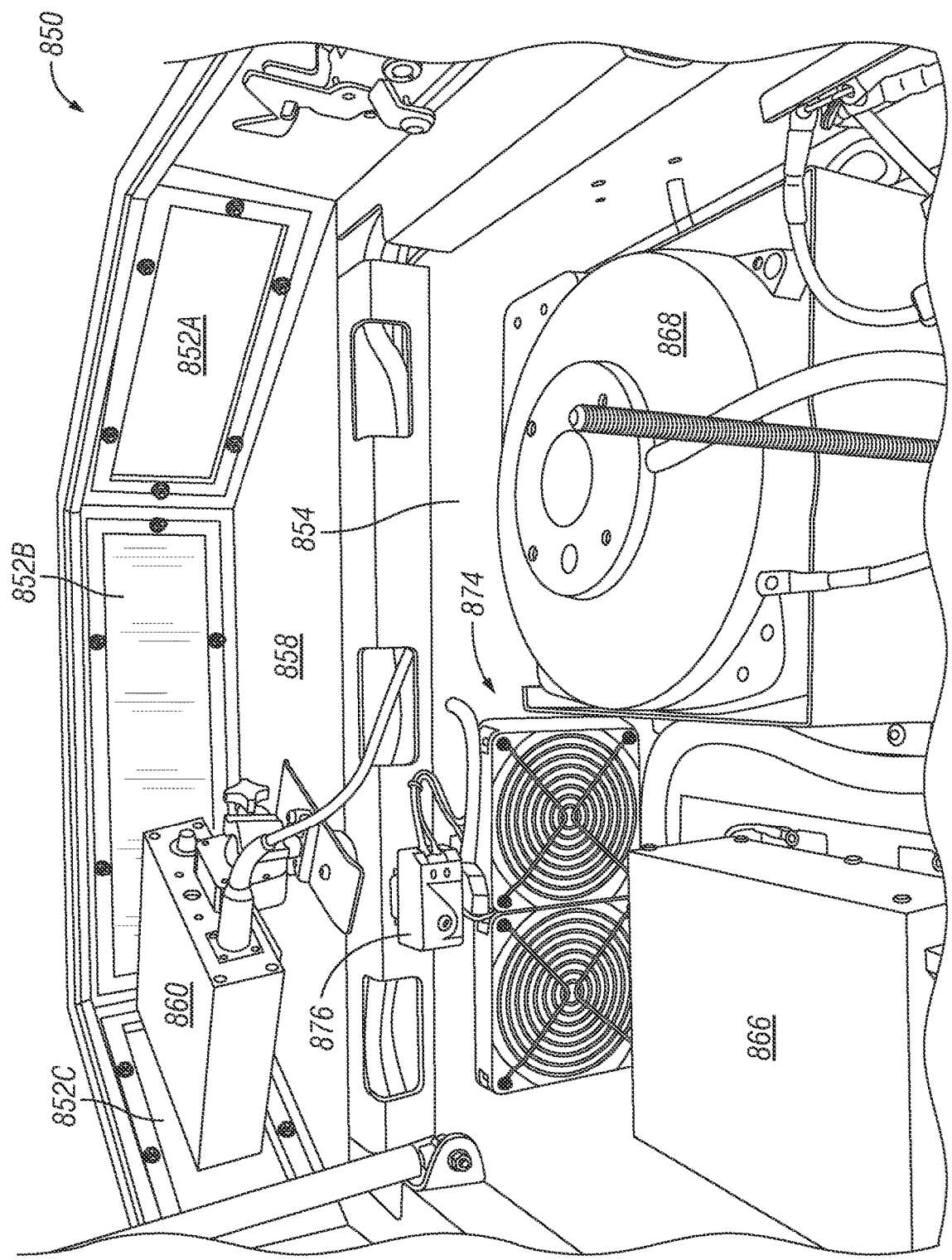
FIG. 8B is an internal side view illustration of a toolbox.

FIG. 8B is an internal side view illustration of a toolbox 850. It depicts imaging apertures 852A/852B/852C, an imaging wing 858, an imaging system 860A, a power control system 866, and a wiring unit 868. Further, this depiction also depicts a thermostat 876 that is connected to a cooling system 874. The cooling system 874 may be used to maintain a consistent temperature in the toolbox and/or prevent overheating.

The toolbox 850 may allow for the covert surveillance of vehicles, pedestrians, and nearby activities without the visible surveillance of a trailer and/or portable camera systems. In at least one embodiment, the toolbox 850. The toolbox 850 may have multiple sides included a front side, a back side, a right side 854, a left side, a bottom, and a removeable top. The right and/or left sides may each include an imaging wing 858. In at least one embodiment, the imaging wing(s) 858 or right or left side(s) 854D/854E may have imaging apertures 852A/852B/852C (collectively imaging apertures 852). The imaging apertures 852 can be clear, opaque, passable with only infrared, allowing for different levels of the visible and non-visible spectrum to pass through. In some examples, the imaging apertures 852 may be clear plastic, glass, or other material, metal, or other material that may be the same color as the toolbox 850.

In FIG. 8B, the imaging apertures 852A and 852C are illustrated as clear, while the imaging aperture 852B is illustrated as opaque. The imaging apertures 852 allow imaging system(s) 860 to capture images, video, and/or other assets or media that can be processed, stored, and/or transmitted. The imaging system 860 may include License Plate Recognition or Reader systems, infrared imaging systems, thermal imaging systems, optical sensors, digital sensors, and/or other types of devices or systems that allow for images to be created. In some examples, this sensors or systems may be digital or a combination of digital, optical, and/or analog components that allow for an image or other viewable asset to be created, processed, and/or stored.

In at least one example, the imaging wing(s) 858 can be positioned in a manner that allows, if used in a pickup or similar vehicle, the imaging systems to have visible access to the nearby area. The imaging apertures 852 can be along the edges of the imaging wing(s) 858. A power control system 866 may provide the ability to step up or down voltage or current to meet the needs of the items within the toolbox 850. These items may, but are not limited to, a computing device that may be utilized to control, process, and/or store images, video or other media or assets from the imaging system(s) 860. These items can all be coupled together with a wiring unit 868 that can allow for coupling of toolbox 850 to a vehicle or other power sources. There may also be a cooling unit 874, similar to U.S. Pat. No. 10,987,992 that is hereby incorporated by reference in its entirety. The cooling unit 874 may activate one or more fans that have a directional control system when a thermostat 876 goes outside of its determined bounds.

Figure 8C:
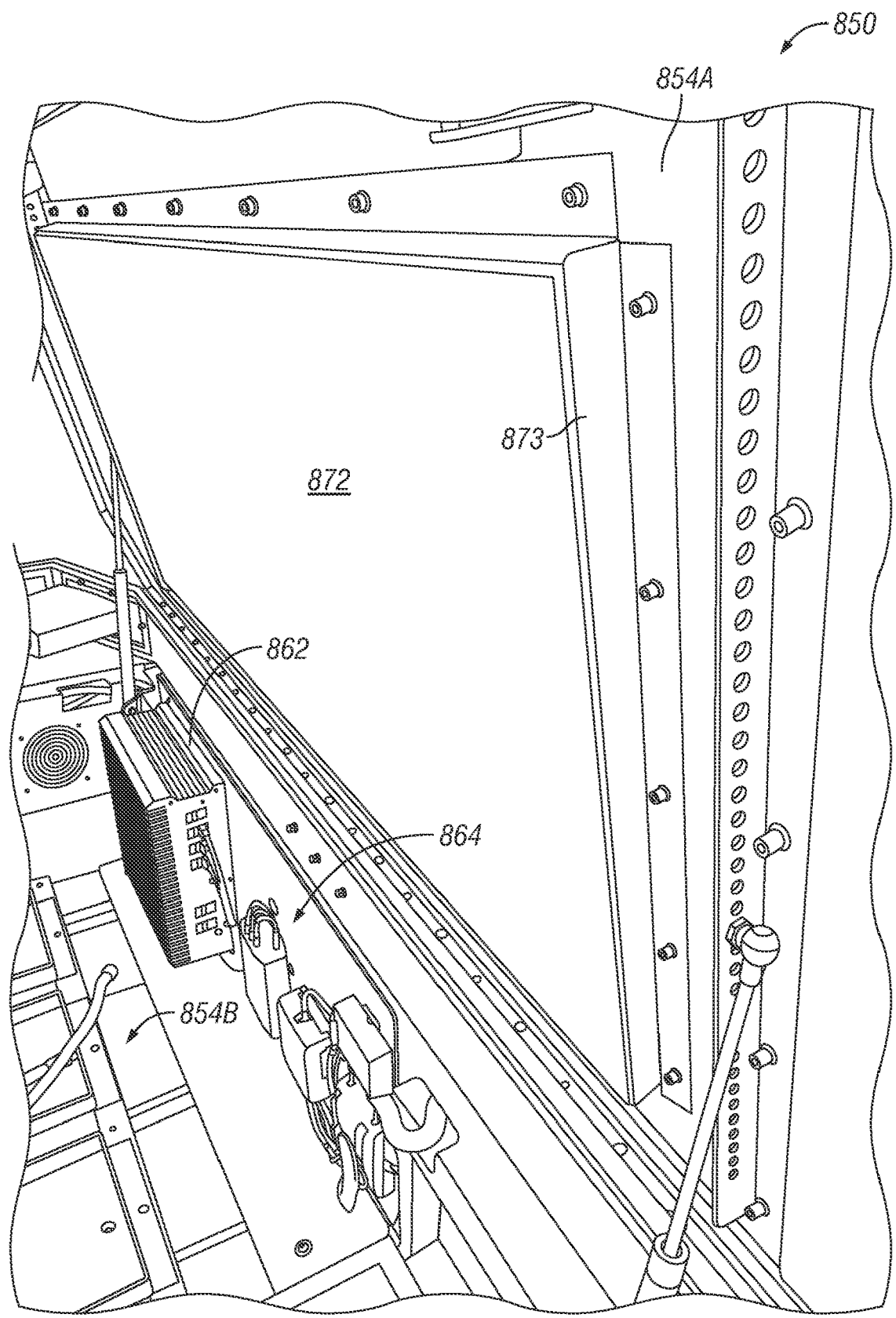
FIG. 8C is an illustration of an open toolbox.

FIG. 8C is an illustration of an open toolbox 850 with the removable top 854A opened. In some examples, the interior of the removable top 854A contains a protective material 872 that is connected to the removable top 854A via a protective material holding device 873. In some examples, this protective material 872 may protect the interior components of the toolbox 850, such as the computing device 862 or set of networking devices 864, from external threats (e.g., hail damage, vehicle collision, etc.).

The toolbox 850 may allow for the covert surveillance of vehicles, pedestrians, and nearby activities without the visible surveillance of a trailer and/or portable camera systems. In at least one embodiment, the toolbox 850. The toolbox 850 may have multiple sides included a bottom 854B, and a removeable top 854A. In some examples, the removable top 854A may include a solar panel or other energy generation. An energy storage system and/or power control system (not illustrated) may provide the ability to step up or down voltage or current to meet the needs of the items within the toolbox 850. These items may, but are not limited to, a computing device 862 that may be utilized to control, process, and/or store images, video or other media or assets from the imaging system(s) 860. The computing device 862 may connect to a set of networking devices 864 that allows the computing device 864 and/or imaging systems 860 to connect with remote computing devices or control systems. The removable top 854A may have a protective material that in some examples, helps to reduce heat buildup within the toolbox 850, while in other example, the protective material 872 may be an armor or hardened material that is bullet or ammunition resistant to provide protective cover for individuals. The protective materials 872 may be coupled to the removable top 854A by a protective material holding bracket 873.

FIG. 8D is an illustration of a closed side view of a toolbox 850. The toolbox 850 may allow for the covert surveillance of vehicles, pedestrians, and nearby activities without the visible surveillance of a trailer and/or portable camera systems. In at least one embodiment, the toolbox 850. The toolbox 850 may have multiple sides included a front side, a back side, a right side 854B, a left side, a bottom, and a removeable top 854A. The right and/or left sides may have imaging apertures 852A/852B/852C (collectively imaging apertures 852). The imaging apertures 852 can be clear, opaque, passable with only infrared, allowing for different levels of the visible and non-visible spectrum to pass through. In some examples, the imaging apertures 852 may be clear plastic, glass, or other material, metal, or other material that may be the same color as the toolbox 850. The imaging apertures 852 allow imaging system(s) (not illustrated) to capture images, video, and/or other assets or media that can be processed, stored, and/or transmitted. There may also be a cooling unit, similar to U.S. Pat. No. 10,987,992 that is hereby incorporated by reference in its entirety. The cooling unit may activate one or more fans that have a directional control system when a thermostat goes outside of its determined bounds causing air to move through the cooling system aperture(s) 875A/875B cooling or heating the toolbox 850. In some examples, the toolbox 850 may also have a GPE receiver on the outside of the toolbox 850 under the imaging wing.

Figure 8E:
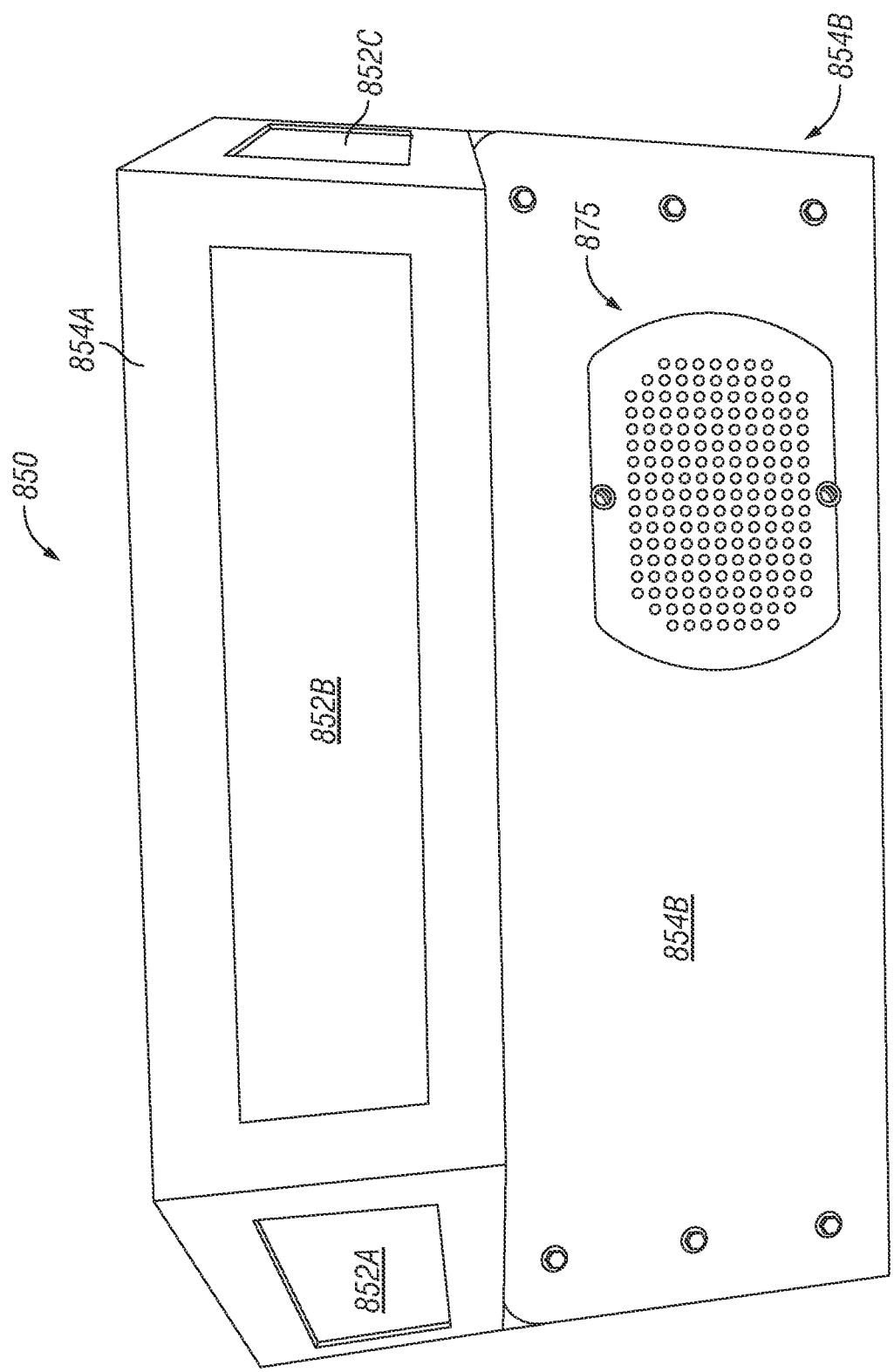
FIG. 8E is an illustration of an open side view of a toolbox.

FIG. 8E is an illustration of an open side view of a toolbox 850. The toolbox 850 may allow for the covert surveillance of vehicles, pedestrians, and nearby activities without the visible surveillance of a trailer and/or portable camera systems. In at least one embodiment, the toolbox 850. The toolbox 850 may have multiple sides included a front side 854D, a back side 854B, a right side 854C, a left side, a bottom, and a removeable top 854A. The right and/or left sides may each include an imaging wing 858. In at least one embodiment, the imaging wing(s) 858 or right or left side(s) 854C may have imaging apertures 852A/852B/852C (collectively imaging apertures 852). The imaging apertures 852 can be clear, opaque, passable with only infrared, allowing for different levels of the visible and non-visible spectrum to pass through. In some examples, the imaging apertures 852 may be clear plastic, glass, or other material, metal, or other material that may be the same color as the toolbox 850. In FIG. 8E, the imaging apertures 852A and 852C are illustrated as clear, while the imaging aperture 852B is illustrated as opaque. The imaging apertures 852 allow imaging system (s) (not illustrated) to capture images, video, and/or other assets or media that can be processed, stored, and/or transmitted.

In at least one example, the imaging wing(s) 858 can be positioned in a manner that allows, if used in a pickup or similar vehicle, the imaging systems to have visible access to the nearby area. The imaging apertures 852 can be along the edges of the imaging wing(s) 858. There may also be a cooling unit, similar to U.S. Pat. No. 10,987,992 that is hereby incorporated by reference in its entirety. The cooling unit may activate one or more fans that have a directional control system when a thermostat goes outside of its determined bounds causing air to move through the cooling system aperture(s) 875 cooling or heating the toolbox 850.

Figure 8F:
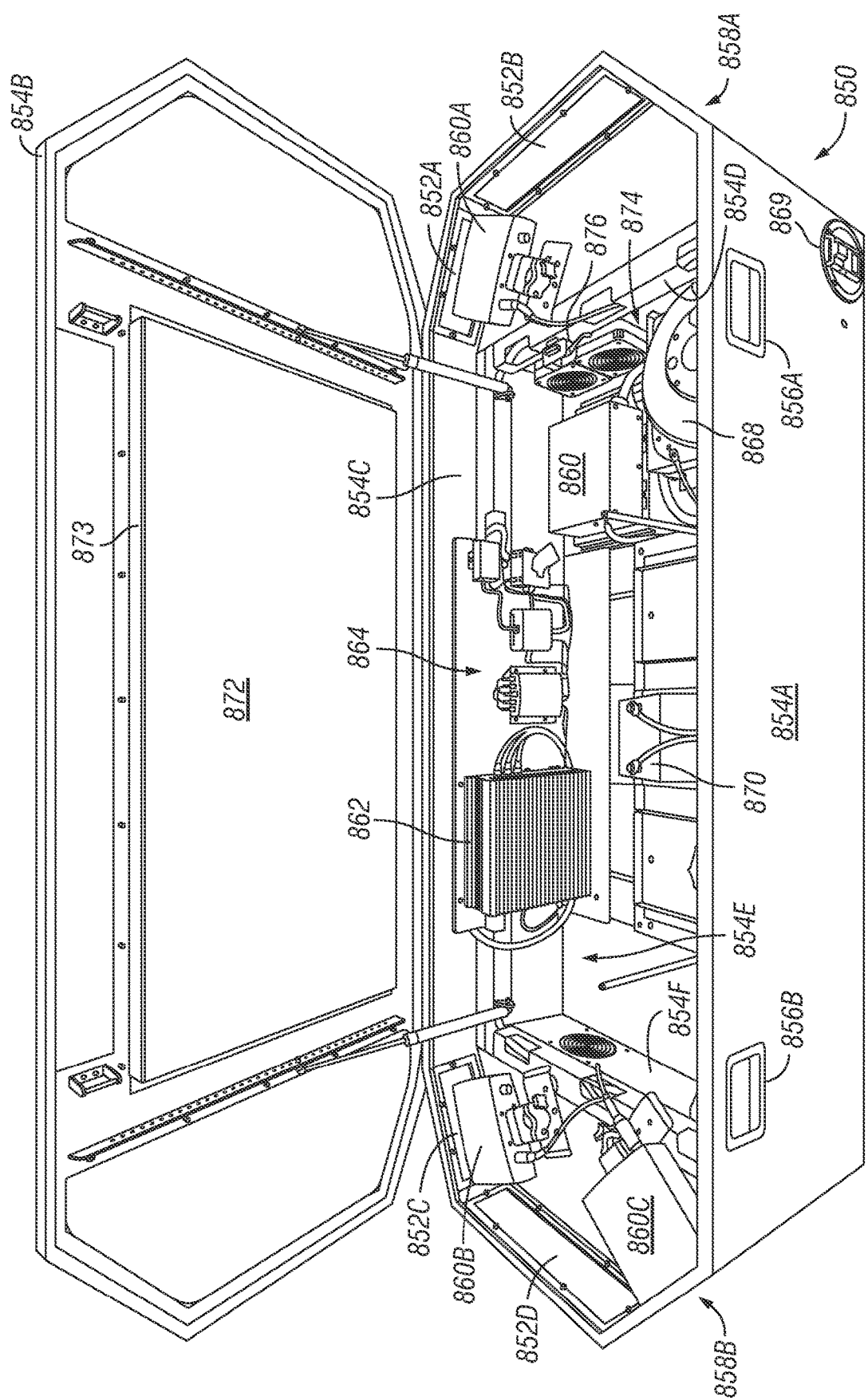
FIG. 8F is an illustration of an open toolbox.

FIG. 8F is an illustration of an open toolbox 850. The toolbox 850 may allow for the covert surveillance of vehicles, pedestrians, and nearby activities without the visible surveillance of a trailer and/or portable camera systems. In at least one embodiment, the toolbox 850. The toolbox 850 may have multiple sides included a front side 854A, a back side 854C, a right side 854D, a left side 854E, a bottom 854F, and a removeable top 854B. The right and/or left sides may each include an imaging wing 858A/858B (collectively imaging wing 858). In at least one embodiment, the imaging wing(s) 858 or right or left side(s) 854D/854E may have imaging apertures 852A/852B/852C/852D/852E and/or 852F (collectively imaging apertures 852). The imaging apertures 852 can be clear, opaque, passable with only infrared, allowing for different levels of the visible and non-visible spectrum to pass through. In some examples, the imaging apertures 852 may be clear plastic, glass, or other material, metal, or other material that may be the same color as the toolbox 850. The imaging apertures 852 allow imaging system(s) 860A/860B/860C (collectively imaging system 860) to capture images, video, and/or other assets or media that can be processed, stored, and/or transmitted.

In at least one example, the imaging wing(s) 858 can be positioned in a manner that allows, if used in a pickup or similar vehicle, the imaging systems to have visible access to the nearby area. The imaging apertures 852 can be along the edges of the imaging wing(s) 858. In some examples, the removable top 854B may include a solar panel or other energy generation. An energy storage system 870 may include batteries or other energy storage that can be coupled to a vehicle or other power source through a power control system 866. The power control system 866 may provide the ability to step up or down voltage or current to meet the needs of the items within the toolbox 850. These items may, but are not limited to, a computing device 862 that may be utilized to control, process, and/or store images, video or other media or assets from the imaging system(s) 860. The computing device 862 may connect to a set of networking devices 864 that allows the computing device 864 and/or imaging systems 860 to connect with remote computing devices or control systems. These items can all be coupled together with a wiring unit 868 that can allow for coupling of toolbox 850 to a vehicle or other power sources. The wiring aperture 869 can allow for the wire of the wiring unit 868 to exit out the toolbox 850. There may also be a cooling unit 874, similar to U.S. Pat. No. 10,987,992 that is hereby incorporated by reference in its entirety. The cooling unit 874 may activate one or more fans that have a directional control system when a thermostat 876 goes outside of its determined bounds. The removable top 854A may have a protective material that in some examples, helps to reduce heat buildup within the toolbox 850, while in other example, the protective material 872 may be an armor or hardened material that is bullet or ammunition resistant to provide protective cover for individuals. The protective materials 872 may be coupled to the removable top 854A by a protective material holding bracket 873.

Figure 9:
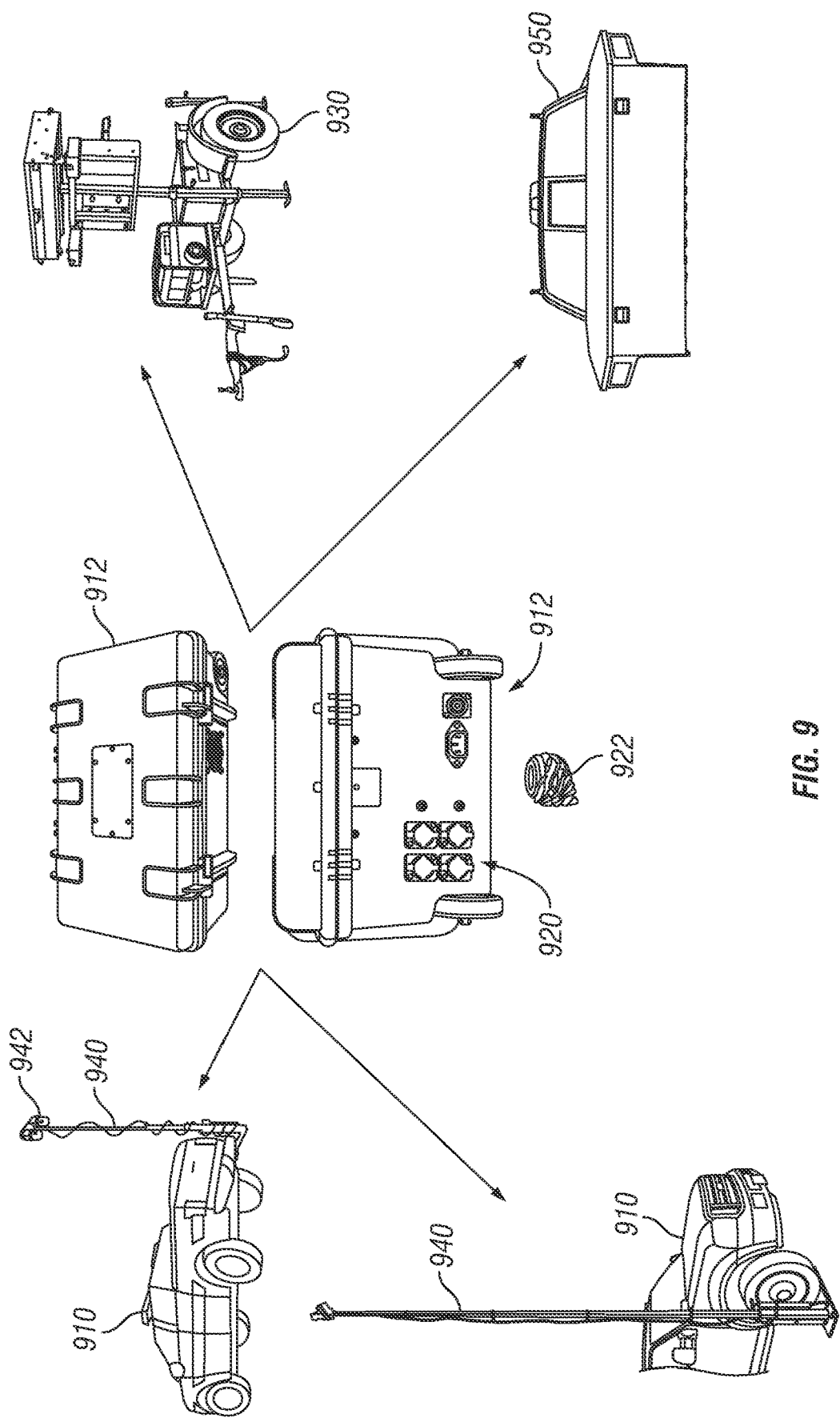
FIG. 9 is an ecosystem view of the use of a portable computing device.

FIG. 9 is an ecosystem view of the use of a portable computing device 912. A portable computing device 912 can allow for many different surveillance sources to be processed, displayed, communicated to, and/or controlled. In at least one example, the portable computing device 912 can be utilized to control surveillance systems that are part of a vehicle 910. The surveillance system(s) may include but are not limited to, a portable mast 940, a portable imaging system 942, a toolbox 950, and/or a trailer 930 that can be pulled or towed by the vehicle 910. Additionally, the portable computing device 912 may also include one or more Digital Video Recorder (DVR) within its case to store images or videos.

These abilities to interface and/or engage can be achieved through a connection system 920 that can include multiple types of plugs or connections that allow for power, data, and/or timing to be connected between multiple devices. Similarly, a master wiring harness 922 can allow for uniform connections across surveillance systems. For example, a master wiring harness 922 can be utilized as an interface between computing devices and surveillance systems, such as a camera system with a communication system 1, while a sensor system using a communication system 2, but if a single wiring harness has the ability to connect to both a communication system 1 and system 2 it allows for communications to be transmitted uniformly without interference.

Figure 10A:
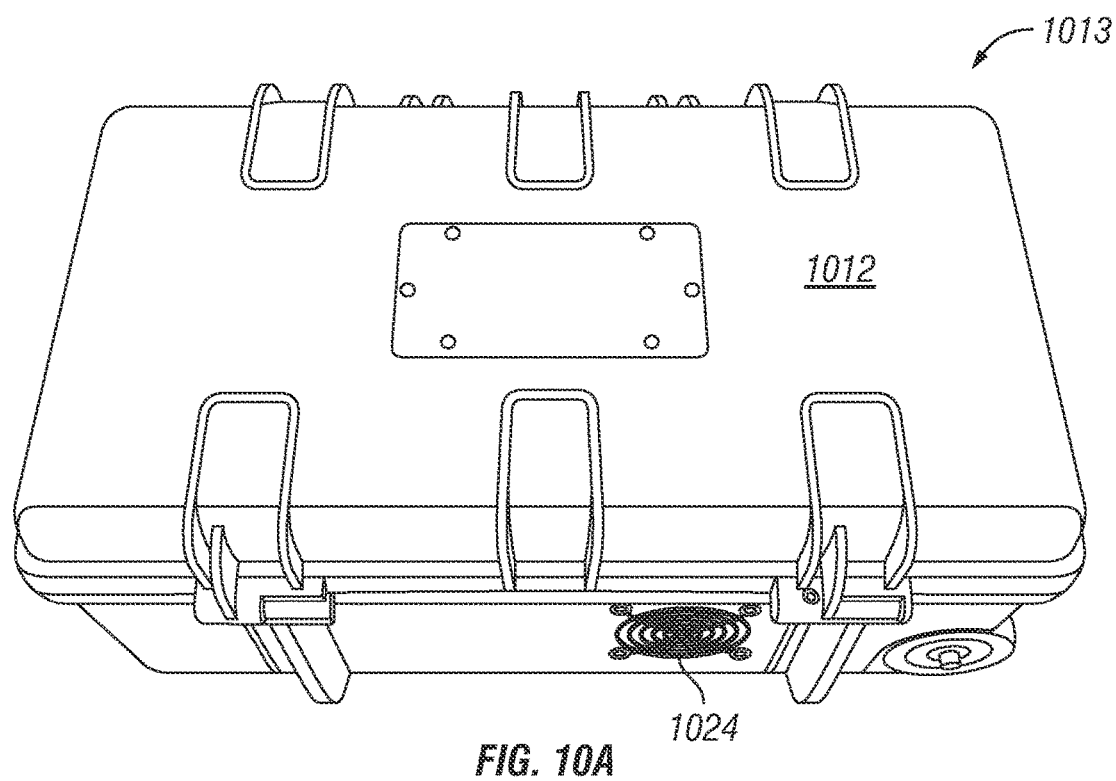
FIG. 10A is a top view of a portable computing device.

FIG. 10A is a top view of a portable computing device 1012. The portable computing device 1012 can be utilized for numerous purposes. In at least one example, the portable computing device is housed within a case 1013. The case 1013 may include a cooling system 1024 similar to U.S. Pat. No. 10,987,992 that is hereby incorporated by reference in its entirety. A portable computing device 1012 can allow for many different surveillance sources to be processed, displayed, communicated to, and/or controlled. In at least one example, the portable computing device 1012 can be utilized to control surveillance systems. While the cooling system 1024 can allow for the temperature within the case to be regulated.

Figure 10B:
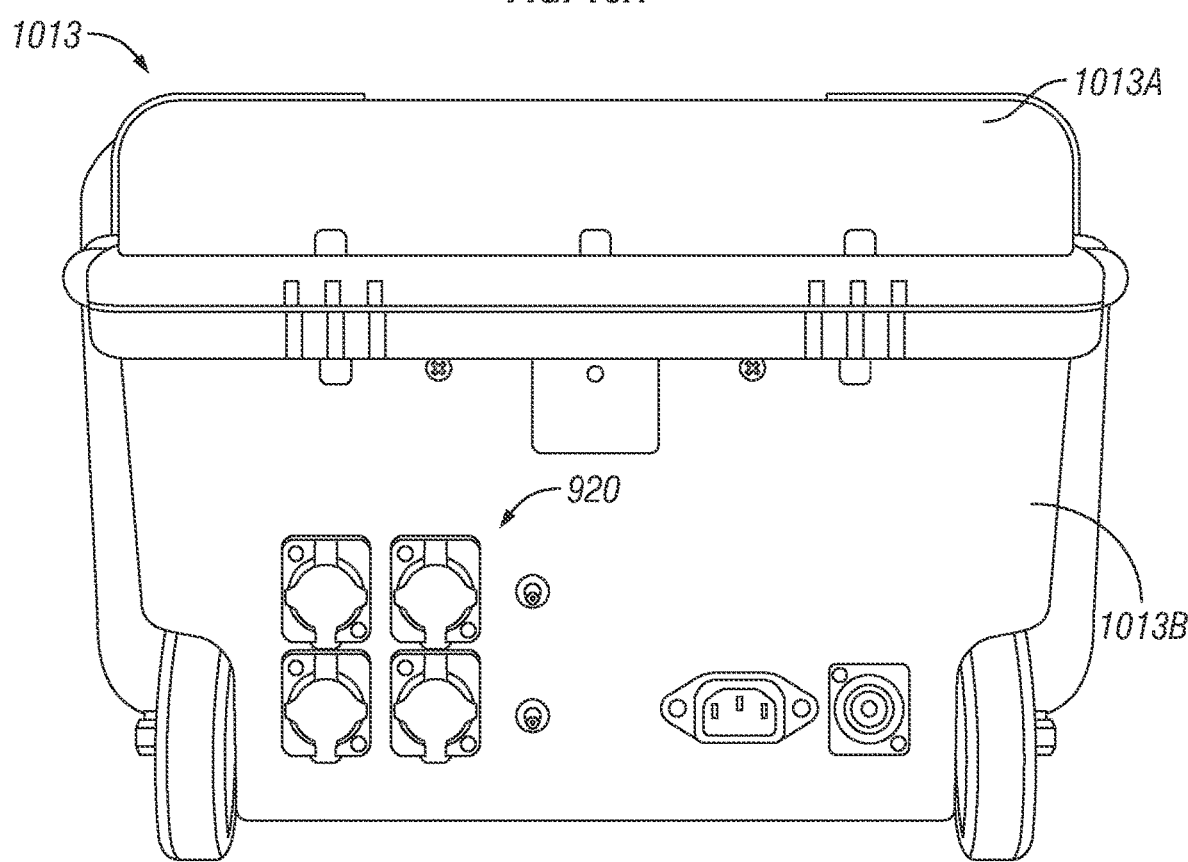
FIG. 10B is a side view illustration of a portable computing device.

FIG. 10B is side view illustration of a portable computing device 1012. The portable computing device 1012 can be utilized for numerous purposes. In at least one example, the portable computing device is housed within a case 1013. A portable computing device 1012 can allow for many different surveillance sources to be processed, displayed, communicated to, and/or controlled. In at least one example, the portable computing device 1012 can be utilized to control surveillance systems. The case 1013 may include a removable top 1013A that can be coupled to a main body 1013B. These abilities to interface and/or engage can be achieved through a connection system 1020 that can include multiple types of plugs or connections that allow for power, data, and/or timing to be connected between multiple devices.

Figure 10C:
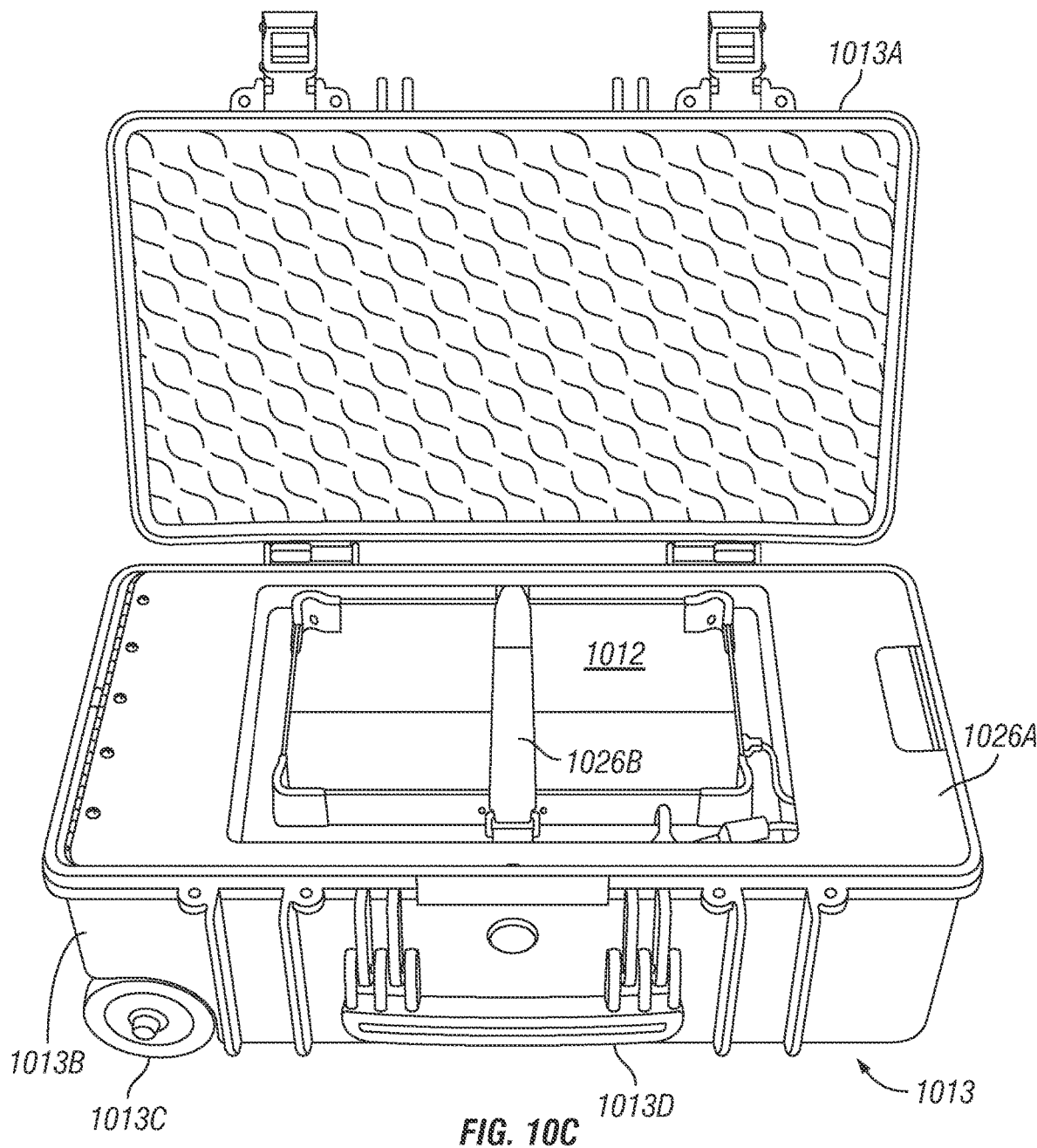
FIG. 10C is an open view illustration of a portable computing device.

FIG. 10C is an open view illustration of a portable computing device 1012. The portable computing device 1012 can be utilized for numerous purposes. In at least one example, the portable computing device is housed within a case 1013. A portable computing device 1012 can allow for many different surveillance sources to be processed, displayed, communicated to, and/or controlled. In at least one example, the portable computing device 1012 can be utilized to control surveillance systems. The case 1013 may include a removable top 1013A that can be coupled to a main body 1013B. In some examples, the main body 1013B may include a wheel assembly 1013C for ease of movement, and/or a handle 1013D for ease of carrying. An internal protection device 1026A can be utilized to protect materials housed within the case 1013, including a portable computing device 1012. In some examples, an internal protection device 1026B may be utilized to control the movement of a portable computing device 1012 within a case 1013.

Figure 10D:
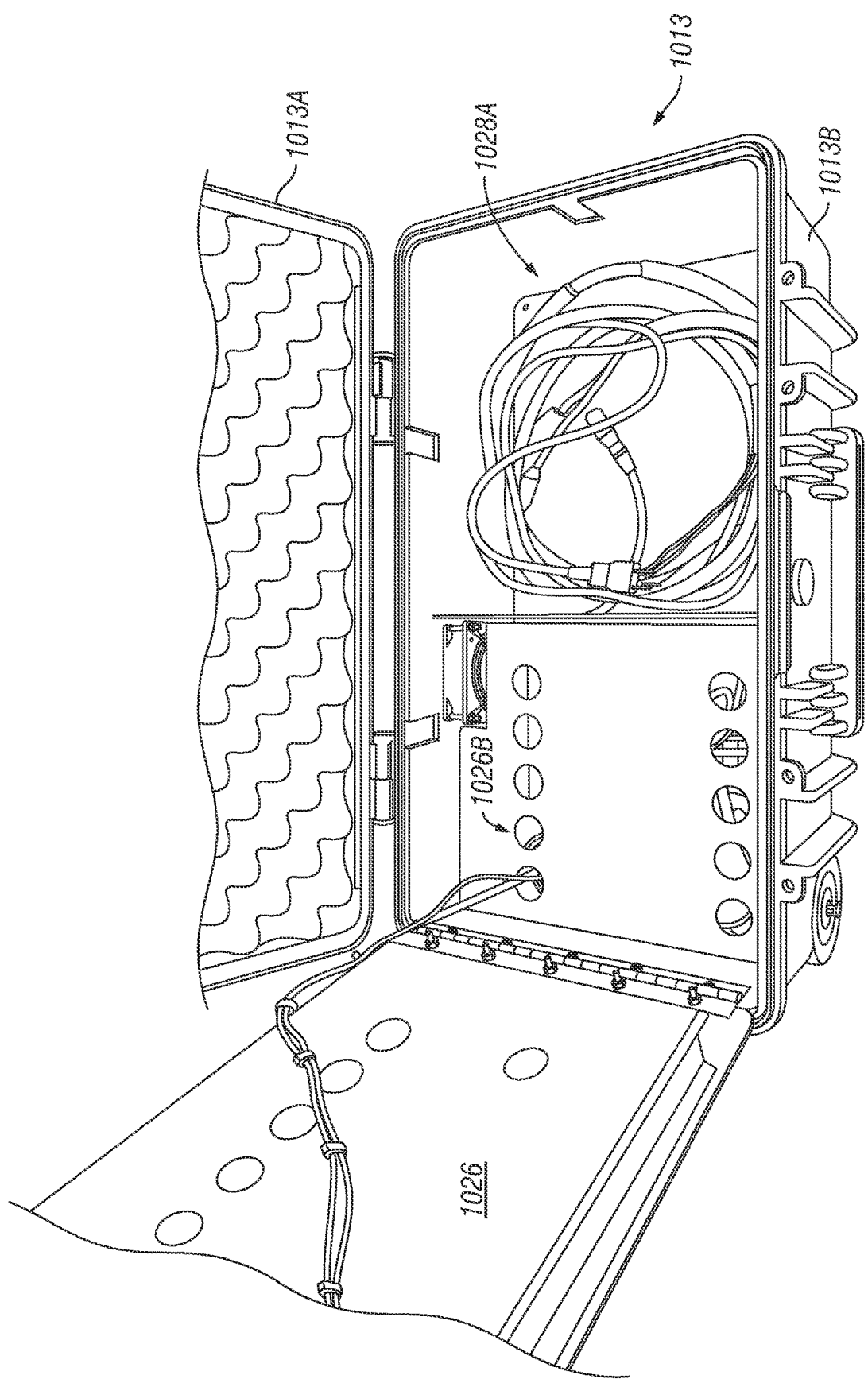
FIG. 10D is an open view illustration of a portable computer device.

FIG. 10D is an open view illustration of a portable computer device 1012. The portable computing device can be utilized for numerous purposes. In at least one example, the portable computing device is housed within a case 1013. The case 1013 may include a removable top 1013A that can be coupled to a main body 1013B. An internal protection device 1026 can be utilized to protect materials housed within the case 1013. A internal wiring system 1028A may allow for the portable computing device to be coupled to various surveillance systems, while an internal organization section 1028B can allow for the wiring to be organized along with any other items or devices to operate, maintain, or connect the portable computing device.

The present disclosure may include a computing device that can include any of an application specific integrated circuit (ASIC), a microprocessor, a microcontroller, a digital signal processor (DSP), a field-programmable gate array (FPGA), or equivalent discrete or integrated logic circuitry. In some examples, the system may include multiple components, such as any combination of one or more microprocessors, one or more microcontrollers, one or more DSPs, one or more ASICs, or one or more FPGAs. It would also be understood that multiples of the circuits, processors, or controllers could be used in combination or in tandem, or multithreading. Additionally, it would be understood that a browser or program could be implemented on a mobile device or mobile computing device, such as, a phone, a mobile phone, a cell phone, a tablet, a laptop, a mobile computer, a personal digital assistant ("PDA"), a processor, a microprocessor, a micro controller, or other devices or electronic systems capable of connecting to a user interface and/or display system. A mobile computing device or mobile device may also operate on or in the same manner as the computing device disclosed herein or be based on improvements thereof.

The components of the present disclosure may include any discrete and/or integrated electronic circuit components that implement analog and/or digital circuits capable of producing the functions attributed to the modules herein. For example, the components may include analog circuits, e.g., amplification circuits, filtering circuits, and/or other signal conditioning circuits. The components may also include digital circuits, e.g., combinational or sequential logic circuits, memory devices, etc. Furthermore, the modules may comprise memory that may include computer-readable instructions that, when executed cause the modules to perform various functions attributed to the modules herein.

Memory may include any volatile, non-volatile, magnetic, or electrical media, such as a random-access memory (RAM), dynamic random-access memory (DRAM), static random-access memory (SRAM), read-only memory (ROM), non-volatile RAM (NVRAM), electrically-erasable programmable ROM (EEPROM), flash memory, hard disks, or any other digital media. Additionally, there may also be a tangible non-transitory computer readable medium that contains machine instructions, such as, a (portable or internally installed) hard drive disc, a flash drive, a compact disc, a DVD, a zip drive, a floppy disc, optical medium, magnetic medium, or any other number of possible drives or discs, that are executed by the internal logic of a computing device. It would be understood that the tangible non-transitory computer readable medium could also be considered a form of memory or storage media.

While this disclosure has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that certain technology is prior art to any embodiment(s) in this disclosure. Neither is the "Brief Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

We claim:

1. A toolbox coupled to a vehicle comprising:
   a bottom;
   at least three sides, wherein each of the at least three sides are coupled with the bottom;
   a removable top coupled to at least one of the at least three sides;
   an energy storage system housed within the toolbox;
   a computing device housed within the toolbox and coupled to the energy storage system;
   at least one imaging system coupled to the computing device and the energy storage system; and
   a cooling system coupled to the energy storage system within the toolbox.
2. The toolbox of claim 1, wherein the imaging system includes a licensing plate reader.
3. The toolbox of claim 1, wherein at least one of the at least three sides further comprises a surveillance aperture.
4. The toolbox of claim 1, wherein the energy storage system further comprises at least one battery and at least one circuit for voltage and current control.
5. The toolbox of claim 1, further comprising a solar panel attached to the removable top and coupled to the energy storage system.
6. The toolbox of claim 1, wherein the energy storage system is coupled to a vehicle power system.
7. The toolbox of claim 1, wherein the cooling system includes at least one fan.
8. A surveillance toolbox coupled to a vehicle comprising:
   a bottom;
   at least three sides coupled to the bottom, and at least one of the at least three sides having a surveillance aperture through it;
   a removable top coupled to at least one of the at least three sides; a computing device housed within the surveillance toolbox with coupled to an energy storage system; and
   a surveillance system configured to access the surveillance aperture and being housed within the surveillance toolbox; and a cooling system coupled to the energy storage system within the surveillance toolbox.
9. The surveillance toolbox of claim 8, wherein the surveillance system further comprises an imaging system.
10. The surveillance toolbox of claim 9, wherein the imaging system further comprises a licensing plate reader.
11. The surveillance toolbox of claim 8, wherein the surveillance system further comprises a sensor system.
12. The surveillance toolbox of claim 11, wherein the sensor system includes at least one microphone.
13. The surveillance toolbox of claim 11, wherein the sensor system includes at least one environmental sensor.
14. The surveillance toolbox of claim 8, further comprising a solar panel attached to the removable top and coupled to the energy storage system.
15. The surveillance toolbox of claim 8, wherein the energy storage system is coupled to a vehicle power system.
16. The surveillance toolbox of claim 8, wherein the cooling system includes at least one fan.
17. A surveillance system comprising:
    an energy storage system;
    a cooling system coupled to the energy storage system;
    an imaging system coupled to the energy storage system;
    a computing device coupled to the energy storage system and the imaging system; and
    a housing to enclose the energy storage system, cooling system, the imaging system, and the computing device.
18. The surveillance system of claim 17, wherein the energy storage system further comprises at least one battery, at least one voltage and current control circuit, and at least one power source.
19. The surveillance system of claim 17, wherein the cooling system comprises at least one fan.
20. The surveillance system of claim 17, wherein the housing further comprises at least one aperture.
21. A portable surveillance system comprising: a trailer; a portable mast coupled to a first side of the trailer; and a fuel powered portable generator opposite the portable mast when coupled to a second side of the trailer.

* * * * *